United States Patent
Park et al.

(10) Patent No.: US 11,206,414 B2
(45) Date of Patent: *Dec. 21, 2021

(54) METHOD FOR INTER PREDICTION AND DEVICE THEREFOR, AND METHOD FOR MOTION COMPENSATION AND DEVICE THEREFOR

(71) Applicant: SAMSUNG ELECTRONICS CO., LTD., Suwon-si (KR)

(72) Inventors: Young-o Park, Seoul (KR); Il-koo Kim, Osan-si (KR); Chan-yul Kim, Seongnam-si (KR); Kwang-pyo Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,149

(22) Filed: Oct. 1, 2020

(65) Prior Publication Data

US 2021/0021845 A1    Jan. 21, 2021

Related U.S. Application Data

(63) Continuation of application No. 16/752,089, filed on Jan. 24, 2020, now Pat. No. 10,819,989, which is a
(Continued)

(51) Int. Cl.
*H04N 19/19* (2014.01)
*H04N 19/196* (2014.01)
(Continued)

(52) U.S. Cl.
CPC ............ *H04N 19/19* (2014.11); *H04N 19/196* (2014.11); *H04N 19/463* (2014.11); *H04N 19/58* (2014.11)

(58) Field of Classification Search
None
See application file for complete search history.

(56) References Cited

U.S. PATENT DOCUMENTS

| 5,926,225 A | 7/1999 | Fukuhara et al. |
| 7,171,053 B2 | 1/2007 | Van der Vleuten |
| (Continued) | | |

FOREIGN PATENT DOCUMENTS

| CN | 1455598 A | 11/2003 |
| CN | 1457551 A | 11/2003 |
| (Continued) | | |

OTHER PUBLICATIONS

Communication dated Oct. 3, 2019 by the Indonesia Intellectual Property Office in counterpart Indonesian Patent Application No. P00201706417.
(Continued)

*Primary Examiner* — Dakshesh D Parikh
(74) *Attorney, Agent, or Firm* — Sughrue Mion, PLLC

(57) ABSTRACT

Provided are an inter prediction method and a motion compensation method. The inter prediction method includes: performing inter prediction on a current image by using a long-term reference image stored in a decoded picture buffer; determining residual data and a motion vector of the current image generated via the inter prediction; and determining least significant bit (LSB) information as a long-term reference index indicating the long-term reference image by dividing picture order count (POC) information of the long-term reference image into most significant bit (MSB) information and the LSB information.

3 Claims, 19 Drawing Sheets

Related U.S. Application Data continuation of application No. 15/917,051, filed on Mar. 9, 2018, now Pat. No. 10,575,002, which is a continuation of application No. 14/354,721, filed as application No. PCT/KR2012/008946 on Oct. 29, 2012, now Pat. No. 9,936,197.

(60) Provisional application No. 61/552,698, filed on Oct. 28, 2011.

(51) Int. Cl.
*H04N 19/463* (2014.01)
*H04N 19/58* (2014.01)

(56) References Cited

U.S. PATENT DOCUMENTS

| | | | |
|---|---|---|---|
| 7,379,496 | B2 | 5/2008 | Holcomb et al. |
| 8,050,328 | B2 | 11/2011 | Iguchi et al. |
| 9,049,427 | B2 | 6/2015 | Hattori |
| 9,872,039 | B2 | 1/2018 | Jeon |
| 2003/0206589 | A1 | 11/2003 | Jeon |
| 2005/0129115 | A1 | 6/2005 | Jeon |
| 2005/0207490 | A1 | 9/2005 | Wang et al. |
| 2007/0058724 | A1 | 3/2007 | Paul et al. |
| 2007/0206673 | A1 | 9/2007 | Cipolli et al. |
| 2008/0043849 | A1 | 2/2008 | Jeon et al. |
| 2008/0165864 | A1 | 7/2008 | Eleftheriadis et al. |
| 2008/0232467 | A1 | 9/2008 | Iguchi et al. |
| 2011/0026593 | A1 | 2/2011 | New et al. |
| 2011/0085779 | A1 | 4/2011 | Hattori |
| 2012/0056638 | A1 | 3/2012 | Swahn |
| 2012/0121017 | A1* | 5/2012 | Chen ............... H04N 19/174 375/240.15 |
| 2013/0077681 | A1* | 3/2013 | Chen ............... H04N 19/176 375/240.12 |
| 2013/0089152 | A1* | 4/2013 | Wang ............... H04N 19/102 375/240.23 |
| 2013/0089154 | A1 | 4/2013 | Chen et al. |
| 2013/0094774 | A1* | 4/2013 | Misra ............... H04N 19/44 382/233 |
| 2014/0064363 | A1* | 3/2014 | Samuelsson ........ H04N 19/50 375/240.12 |
| 2015/0078458 | A1 | 3/2015 | Samuelsson et al. |

FOREIGN PATENT DOCUMENTS

| | | |
|---|---|---|
| GB | 2388267 B | 8/2004 |
| JP | 2003-102017 A | 4/2003 |
| JP | 2004-163697 A | 6/2004 |
| JP | 2010-263616 A | 11/2010 |
| JP | 2014523691 A | 9/2014 |
| JP | 2014529204 A | 10/2014 |
| JP | 2014530573 A | 11/2014 |
| JP | 2014532374 A | 12/2014 |
| KR | 2003-0086214 A | 11/2003 |
| KR | 2003-0088543 A | 11/2003 |
| KR | 10-2004-0078935 A | 9/2004 |
| KR | 10-2005-0061438 A | 6/2005 |
| SG | 11201401880 | 7/2014 |
| TW | 201043039 A1 | 12/2010 |
| WO | 2006075635 A1 | 7/2006 |
| WO | 2011087321 A2 | 7/2011 |
| WO | 2011103482 A1 | 8/2011 |
| WO | 2013002701 A1 | 1/2013 |
| WO | 2013044075 A2 | 3/2013 |
| WO | 2013054951 A1 | 4/2013 |
| WO | 2013055681 A1 | 4/2013 |

OTHER PUBLICATIONS

Communication dated Nov. 11, 2019 by the Indonesia Intellectual Property Office in counterpart Indonesian Patent Application No. P00201706418.

Communication dated Jun. 18, 2019, from the State Intellectual Property Office of People's Republic of China in counterpart Application No. 201710675946.1.

Communication dated Jun. 18, 2019, from the State Intellectual Property Office of People's Republic of China in counterpart Application No. 201710676220.X.

Communication dated Jun. 25, 2019, from the State Intellectual Property Office of People's Republic of China in counterpart Application No. 201710675921.1.

Communication dated Jun. 18, 2019, from the State Intellectual Property Office of People's Republic of China in counterpart Application No. 201710676421.X.

"Text of ISO/IEC FDIS 14496-10: Information Technology—Coding of audio-visual objects—Part 10: Advanced Video Coding", International Organisation for Standardisation, ISO/IEC JTC 1/SC 29/WG 11 N5555 Coding of Moving Pictures and Audio, Mar. 31, 2003, Total 269 pages.

Bross B et al., "High Efficiency Video Coding (HEVC) text specification draft 9" (SoDIS), 11 JCT-VC Meeting; 102, MPEG Meeting; Oct. 10, 2012; Shanghai; (Joint Collaborative Team on Video Coding of ISO/IEC JTC1/SC29/WG11 and ITU-T SG. 16); URL:http://wftp3 itu. int/av-arch/jctvc-site/, No. JCTVC-K1003, Oct. 21, 2011 (Oct. 21, 2012), pp. 1-280, XP030113269.

Bross et al., "High efficiency video coding (HEVC) text specification draft 8", Joint Collaborative Team on Video Coding (JCT-VC) of ITU-T SG16 WP3 and ISO/IEC JTC1/SC/29/WG11, 10th Meeting: Stockholm, SE, Jul. 11, 2012-Jul. 20, 2012, Document: JCTVC-J1003_d7, fifty-two (52) pages total.

Bross, et al., "WD4: Working Draft 4 of High-Efficiency Video Coding", Joint Collaborative Team on Video Coding (JCT-VC) of ITU-T SG16 WP3 and ISO/IEC JTC1/SC29/WG11, Jul. 14-22, 2011, 229 pages total.

Communication dated Apr. 21, 2017 issued by the Intellectual Property Office of the Philippines Bureau of Patents in counterpart Philippine Patent Application No. 1-2016-502410 (PHDIV2).

Communication dated Apr. 21, 2017 issued by the Intellectual Property Office of the Philippines Bureau of Patents in counterpart Philippine Patent Application No. 1-2016-502412 (PHDIV4).

Communication dated Dec. 2, 2016, issued by the Chinese Intellectual Property Office of P.R. China in counterpart Chinese Application No. 201280065429.8.

Communication dated Mar. 1, 2017, issued by the Intellectual Property Office of Singapore in counterpart Singaporean Application No. 10201606572R.

Communication dated May 4, 2017 issued by the Intellectual Property Office of the Philippines Bureau of Patents in counterpart Philippine Patent Application No. 1-2016-502409 (PHDIV1).

Communication dated Oct. 10, 2017 by the Japan Patent Office in counterpart Japanese Patent Application No. 2016-224328.

Communication dated Sep. 28, 2017 by the Taiwan Intellectual Property Office in counterpart Taiwanese Patent Application No. 106103408.

Deshpande et al., "AHG21: Comments on Signaling of Reference Pictures", Joint Collaborative Team on Video Calling (JCT-VC) of ITU-T SG16 WP3 and ISO/IEC JTC1/SC29/WG11, Feb. 1-10, 2012, 5 pages total, 8th Meeting, Sharp Labs of America, Inc., San Jose CA, USA, JCTVC-H0531, XP030111558.

Extended European Search Report dated Aug. 11, 2015, issued by the European Patent Office in counterpart European Application No. 12843664.9.

Misra, et al., "Long term picture referencing using wrapped POC" Joint Collaborative Team on Video Coding (JCT-VC) of ITU-T SG16 WP3 and ISO/IEC JTC1/SC29/WG11, 7th Meeting: Geneva CH, Nov. 21-30, 2011, JCTVC-G713r2, pp. 1-5.

Office Action dated May 19, 2015, issued by the Japanese Patent Office in counterpart Japanese Application No. 2014-538721.

Park Y et al., "AHG21: Combined signaling for reference picture set" Joint Collaborative Team on Video Coding JCT-VC) of ITU-T SG16 WP3 and ISO/IEC JTC1/SC29/WG11, Nov. 8, 2011/ pp. 1-3, XP030110510 (JCTVC-G526).

Park, et al., "AHG21: Combined signaling for reference picture set", Joint Collaborative Team on Video Coding (JCT-VC) of ITU-T

(56) References Cited

OTHER PUBLICATIONS

SG16 WP3 and ISO/IEC JTC1/SC29/WG11, 7th meeting: Geneva, CH, Nov. 2011, JCTVC-G526-r3, pp. 1-5.
Sjoberg, et al., "Absolute Signaling of Reference Pictures" Joint Collaborative Team on Video Coding (JCT-VC) of ITU-T SG16 WP3 and ISO/IEC JTC1/SC29/WG11, Jul. 2011, pp. 1-15.
Sullivan G J et al., "Proposal on Decoded Picture Buffer Description Syntax Relating to AHG21 and JCTVC-F493" Joint Collaborative Team on Video Coding (JCT-VC) of ITU-T SG16 WP3 and ISO/IEC JTC1/SC29/WG11, Nov. 20, 2011, pp. 1-11, XP030050923 (JCTVC-G788_r1).
Sjoberg G J et al., "Absolute signaling of reference pictures" Joint Collaborative Team on Video Coding (JCT-VS) of ITITU-T SG16 WP3 and ISO/IEC JTC1/SC29/WG11, 6th meeting: Torino, Jul. 2011, 16 pages total.
Benjamin Bross et al., "WD4: Working Draft 4 of High-Efficiency Video Coding," Joint Collaborative Team on Video Coding (JTC-VC) of ITU-T SG16 WP3 and ISO/IEC JTC1/SC29/WG11, 6th Meeting: Torino IT, Jul. 14-22, 2011, Document JCTVC-F803_d4 (Version 6), Oct. 22, 2011, Total 231 pages).
Communication dated Jan. 24, 2019, issued by the Taiwan Patent Office in counterpart Taiwan Application No. 107106198.
Communication dated Feb. 19, 2019, issued by the Indian Intellectual Property Office in corresponding Application No. 926/MUMNP/2014.
Communication dated Dec. 30, 2016, issued by the Taiwanese Patent Office in counterpart Taiwanese Application No. 105126004.
Communication dated Jul. 4, 2016 issued by the European Patent Office in counterpart European Patent Application No. 12 843 664.9.
Communication dated May 4, 2017 issued by the Intellectual Property Office of the Philippines Bureau of Patents in counterpart Philippine Patent Application No. 1-2016-502413 (PHDIV3).
Communication dated Nov. 24, 2015 issued by the Canadian Intellectual Property Office in counterpart Canadian Patent Application No. 2,853,788.
Communication dated Sep. 22, 2016, issued by the Korean Intellectual Property Office in counterpart Korean Application No. 10-2012-0120621.
Communication dated Sep. 22, 2016, issued by the Korean Intellectual Property Office in counterpart Korean Application No. 10-2014-0148753.
Communication dated Mar. 28, 2016, issued by the Taiwanese Intellectual Property Office in counterpart Taiwanese Patent Application No. 101139992.
International Search Report (PCT/ISA/210) and Written Opinion (PCT/ISA/237) dated Feb. 25, 2013, issued by the International Searching Authority in counterpart International Application No. PCT/KR2012/008946.
Sjoberg, et al., "Absolute Signaling of Reference Pictures", Ericsson Internal, Jul. 8, 2011, pp. 1-21.
Sjoberg, et al., "AHG21: Long-term pictures and pruning of reference picture sets" Joint Collaborative Team on Video Coding (JCT-VC) of ITU-T SG16 WP3 and ISO/IEC JTC/SC29/WG11, 7th Meeting: Geneva, CH, Nov. 21-30, 2011, JCTVC-G637, pp. 1-3.
Sjoberg, et al., "Proposed changes to the HEVC Working Draft", Joint Collaborative Team on Video Coding (JCT-VC) of ITU-T SG16 WP3 and ISO/IEC JTC1/SC29/WG11, 2011, total pp. 10.
Wahadaniah, V. et al., "AHG21: Construction and modification of predefined reference picture sets and Yeference picture lists" 7. JCT-VC Meeting; 98 MPEG Meeting; Nov. 21, 2011-Nov. 30, 2011; Geneva; (Joint Collaborative Team on Video Coding (JCT-VC) of ITU-SG16 WP3 and ISO/IEC JTC1/SC29/WG11, http://WFTP3.ITU.INT/AV-ARCH/JCTVC-SITE/, No. JCTVC-G548, Nov. 8, 2011, pp. 1-21, XP030110532.
Wang, et al., "AHG21: On DPB management" Joint Collaborative Team on Video Coding (JCT-VC) of ITU-T SG16 WP3 and ISO/IEC JTC1/SC29/WG11,7th Meeting: Geneva, CH, Nov. 2011, Nov. 21-30, 2011, JCTVC-G314, pp. 1-7.
Wiegand et al., "Study of Final Committee Draft of Joint Video Specification (ITU-T Rec. H.264 | ISO/IEC 14496-10 AVC)", 6.. JVT Meeting; 63 MPEG Meeting; Sep. 12, 2002-Dec. 13, 2002; Awaji, JP; (Joint Video Team of ISO/IEC JTC1/SC29/GF11 and ITU-T SG.16), No. JVT-F100, , Dec. 13, 2002, pp. 1-242, XP030O05665, ISSN: 0000-0428.
Communication dated Apr. 3, 2018, issued by the Japanese Patent Office in counterpart Japanese Application No. 2016-224328.
Office Action dated Sep. 28, 2018 by the Intellectual Property Corporation of Malaysia in counterpart Malaysian Patent Application No. PI 2014001217.
Communication from the Intellectual Property Corporation of Malaysia, dated Mar. 4, 2019 in counterpart application No. PI 2014001217.
Sjoberg G J et al., "Absolute signaling of reference pictures" Joint Collaborative Team on Video Coding (JCT-VC) of ITU-T SG16 WPS and ISO/IEC JTC1/SC29/WG11, 6th meeting : Torino, Jul. 1, 2011, CTVC-F493, pp. 1-10, XP030009516.
Communication dated Jun. 25, 2020 issued by the Intellectual Property Office of the Philippines Bureau of Patents in counterpart Philippine Patent Application No. 1-2016-502409.

* cited by examiner

FIG. 3
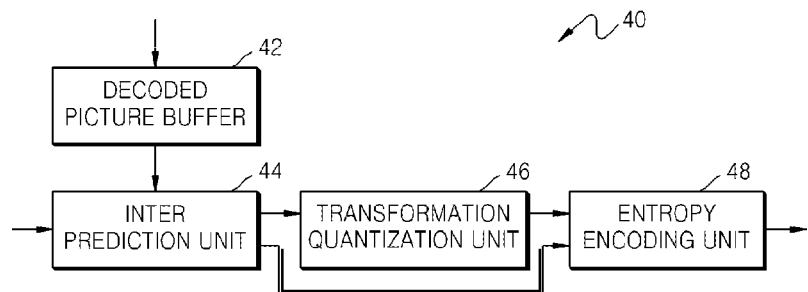
FIG. 4
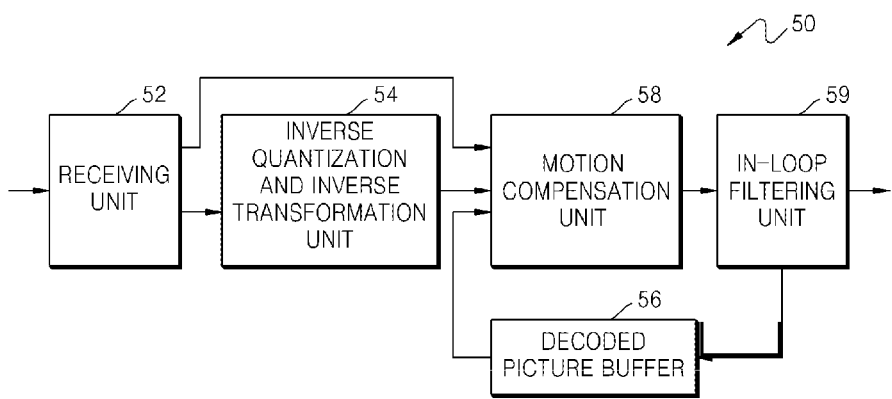
FIG. 5

CODING UNIT (1010)

PREDICTION UNIT (1060)

METHOD FOR INTER PREDICTION AND DEVICE THEREFOR, AND METHOD FOR MOTION COMPENSATION AND DEVICE THEREFOR

CROSS-REFERENCE TO RELATED APPLICATIONS

This application is a continuation of U.S. application Ser. No. 16/752,089 filed Jan. 24, 2020, which is a continuation of U.S. application Ser. No. 15/917,051 filed Mar. 9, 2018, now U.S. Pat. No. 10,575,002 issued Feb. 25, 2020, which is a continuation of U.S. application Ser. No. 14/354,721 filed Apr. 28, 2014, now U.S. Pat. No. 9,936,197 issued Apr. 3, 2018, which is a U.S. National Stage of International Application No. PCT/KR2012/008946 having an International Filing Date of Oct. 29, 2012, which claims the benefit of U.S. Provisional Application No. 61/552,698 filed Oct. 28, 2011. The entire disclosures of the prior applications are considered part of the disclosure of the accompanying continuation, and are hereby incorporated by reference.

TECHNICAL FIELD

The present invention relates to an inter prediction method and a motion compensation method.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

DETAILED DESCRIPTION OF THE INVENTION

Technical Problem

The present invention provides an inter prediction method and an inter prediction apparatus, which use a long-term reference image, and a motion compensation method and a motion compensation apparatus, which use a long-term reference image. The present invention also provides a video encoding method and a video encoding apparatus, which involve inter prediction and motion compensation using a long-term reference image, and a video decoding method and a video decoding apparatus, which involve motion compensation using a long-term reference image.

Technical Solution

According to an aspect of the present invention, there is provided an inter prediction method including: performing inter prediction on a current image by using a long-term reference image stored in a decoded picture buffer; determining residual data and a motion vector of the current image generated via the inter prediction; and determining least significant bit (LSB) information as a long-term reference index indicating the long-term reference image by dividing picture order count (POC) information of the long-term reference image into most significant bit (MSB) information and the LSB information.

Advantageous Effects

According to a motion compensation method of the present invention, least significant bit (LSB) information of picture order count (POC) information of a long-term reference image may be used as a reference index indicating a long-term reference image among reference images used for inter prediction of an image. A long-term reference image may be indicated by using POC information of an image without having to use separate image numbers for long-term reference images in order to identify the long-term reference images. Accordingly, no storage space for storing the separate image numbers for the long-term reference images may be spared. Also, a range of indexes indicating the long-term reference images may be infinite.

DESCRIPTION OF THE DRAWINGS

FIG. 3 is a table showing least significant bit (LSB) information and most significant bit (MSB) information of picture order count (POC) information of a long-term reference image, according to an embodiment of the present invention;

FIG. 4 is a block diagram of a video encoding apparatus that performs inter prediction, according to an embodiment of the present invention;

FIG. 5 is a block diagram of a video decoding apparatus that performs motion compensation, according to an embodiment of the present invention;

BEST MODE

Figure 1A:
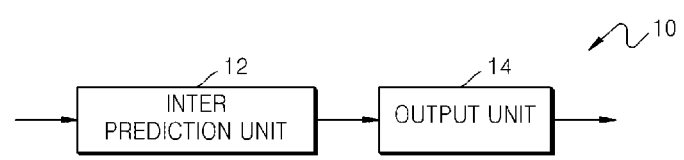
FIG. 1A is a block diagram of an inter prediction apparatus according to an embodiment of the present invention.

According to an aspect according to the present invention, there is provided an inter prediction method including: performing inter prediction on a current image by using a long-term reference image stored in a decoded picture buffer; determining residual data and a motion vector of the current image generated via the inter prediction; and determining least significant bit (LSB) information as a long-term reference index indicating the long-term reference image by dividing picture order count (POC) information of the long-term reference image into most significant bit (MSB) information and the LSB information.

The determining of the LSB information may include inserting LSB information of POC information of a long-term reference image used for inter prediction of a current slice into a slice header, as the long-term reference index.

The determining of the LSB information may include dividing difference information between POC information of the current image and the POC information of the long-term reference image into MSB information and LSB information to determine the LSB information of the difference information as the long-term reference index.

The inter prediction method may further include: performing inter prediction on the current image by using a short-term reference image stored in the decoded picture buffer; and determining LSB information of POC information of the short-term reference image as a short-term reference index indicating the short-term reference image.

The determining of the residual data and the motion vector may include determining the residual data and the motion vector according to blocks of the current image, based on results of inter prediction performed according to the blocks of the current image.

According to another aspect according to the present invention, there is provided a motion compensation method including: receiving encoded image data, a motion vector, and a long-term reference index; restoring residual data of a current image by decoding the encoded image data; determining picture order count (POC) information by using most significant bit (MSB) information and least significant bit (LSB) information of a long-term reference image of the current image by reading the LSB information of the POC information of the long-term reference image from the long-term reference index; and restoring the current image by performing motion compensation using the motion vector and the residual data based on the long-term reference image corresponding to the determined POC information from among reference images stored in a decoded picture buffer.

The determining of the POC information may include: predicting MSB information of POC information of a second long-term reference image from MSB information of POC information of a first long-term reference image, from among a plurality of long-term reference images for the current image; and restoring the POC information of the second long-term reference image by composing LSB information of the POC information of the second long-term reference image read from the received long-term reference index, and the MSB information of the POC information of the second long-term reference image.

The determining of the POC information may include: restoring difference information between POC information of the current image and the POC information of the long-term reference image by composing the MSB information and the LSB information of the POC information of the long-term reference image; and determining a POC number of the long-term reference image by adding or subtracting the difference information to or from the POC information of the current image.

The receiving may include parsing the long-term reference index indicating a long-term reference image for motion compensation of a current slice from a slice header.

The motion compensation method may further include: receiving a short-term reference index for inter prediction of the current image; reading LSB information of POC information of a short-term reference image for inter prediction of the current image, from the short-term reference index; determining the POC information of the short-term reference image by using the read LSB information of the short-term reference image and MSB information of a previous short-term reference image; and performing motion compensation on the current image by using the short-term reference image corresponding to the determined POC information from among reference images stored in the decoded picture buffer.

The receiving may include receiving the encoded image data according to blocks of the current image, the restoring of the residual data may include restoring the residual data and the motion vector according to the blocks, and the restoring of the current image may include restoring the current image by performing motion compensation using the residual data and the motion vector according to the blocks.

According to another aspect according to the present invention, there is provided an inter prediction apparatus including: an inter prediction unit for performing inter prediction on a current image by using a long-term reference image stored in a decoded picture buffer; an output unit for outputting least significant bit (LSB) information as a long-term reference index indicating the long-term reference image by dividing picture order count (POC) information of the long-term reference image into most significant bit (MSB) information and the LSB information, and outputting residual data and a motion vector of the current image generated via the inter prediction.

According to another aspect according to the present invention, there is provided a motion compensation apparatus including: a receiving unit for receiving encoded image data, a motion vector, and a long-term reference index; and a motion compensation unit for restoring residual data of a current image by decoding the encoded image data, reading least significant bit (LSB) information of picture order count (POC) information of a long-term reference image of the current image from the long-term reference index, determining the POC information by using most significant bit (MSB) information and the LSB information of the long-term reference image, and restoring the current image by performing motion compensation using the motion vector and the residual data based on the long-term reference image corresponding to the determined POC information from among reference images stored in a decoded picture buffer.

According to another aspect according to the present invention, there is provided a computer-readable recording medium having recorded thereon a program for executing the inter prediction method.

According to another aspect according to the present invention, there is provided a computer-readable recording medium having recorded thereon a program for executing the motion compensation method.

According to another aspect according to the present invention, there is provided a video encoding apparatus including: a decoded picture buffer for storing reference images for inter prediction of an image; an inter prediction unit for generating residual data by performing inter prediction on a current image by using a long-term reference image stored in the decoded picture buffer; a transformation quantization unit for generating a quantized transformation coefficient by performing transformation and quantization on the residual data; and an entropy encoding unit for performing entropy encoding on least significant bit (LSB) information that is a long-term reference index indicating the long-term reference image, and symbols including the quantized transformation coefficient and a motion vector by dividing picture order count (POC) information of the long-term reference image into most significant bit (MSB) information and the LSB information.

According to another aspect according to the present invention, there is to provided a video decoding apparatus including: a receiving unit for receiving a video stream and parsing encoded image data, a motion vector, and a long-term reference index by performing entropy decoding on the received video stream; an inverse quantization and inverse transformation unit for restoring residual data by performing inverse quantization and inverse transformation on the encoded image data; a decoded picture buffer for storing reference images for motion compensation; a motion compensation unit for restoring residual data of a current image by decoding the encoded image data, reading least significant bit (LSB) information of picture order count (POC) information of a long-term reference image of the current image from the long-term reference index, determining the POC information by using most significant bit (MSB) information and the LSB information of the long-term reference image, and performing motion compensation using the motion vector and the residual data based on the long-term reference image corresponding to the determined POC information from among reference images stored in the decoded picture buffer; and an in-loop filtering unit for performing deblocking filtering on a restored image generated via the motion compensation.

MODE OF THE INVENTION

Hereinafter, an inter prediction method and an inter prediction apparatus, and a motion compensation method and a motion compensation apparatus, which use a long-term reference image, according to embodiments of the present invention, will be described with reference to FIGS. 1 through 3. Also, a video encoding apparatus that performs inter prediction and a video decoding apparatus that performs motion compensation, according to embodiments of the present invention, will be described with reference to FIGS. 4 and 5. Also, a video encoding technique and a video decoding technique involving inter prediction based on coding units having a tree structure, according to embodiments of the present invention, will be described with reference to FIGS. 6 through 18. Hereinafter, an 'image' may denote a still image or a moving image of a video, or a video itself.

First, an inter prediction method and an inter prediction apparatus, which use a long-term reference image, according to embodiments of the present invention, will be described with reference to FIGS. 1A through 3. Then, a video encoding method and a video decoding method, which involve inter prediction, according to embodiments of the present invention, will be described with reference to FIGS. 4 and 5.

FIG. 1A is a block diagram of an inter prediction apparatus 10 according to an embodiment of the present invention.

The inter prediction apparatus 10 includes an inter prediction unit 12 and an output unit 14.

Inter prediction uses similarity between a current image and another image. A reference region similar to a current region of the current image is detected from a reference image restored before the current image. A distance between the current region and the reference region on coordinates is expressed in a motion vector, and a difference between pixel values of the current region and the reference region is expressed as residual data. Accordingly, instead of directly outputting image information of the current region, an index indicating the reference image, the motion vector, and the residual data may be output via inter prediction of the current region.

The inter prediction apparatus 10 according to an embodiment may perform inter prediction according to blocks of each image of a video. A block may have a square shape, a rectangular shape, or an arbitrary geometrical shape, and is not limited to a data unit having a predetermined size. The block according to an embodiment may be a maximum coding unit, a coding unit, a prediction unit, or a transformation unit, among coding units according to a tree structure. Video encoding and decoding methods based on coding units according to a tree structure will be described later with reference to FIGS. 6 through 18.

The reference image used for inter prediction of the current image must be decoded before the current image. The reference image for inter prediction according to an embodiment may be classified into a short-term reference image and a long-term reference image. A decoded picture buffer stores restored images generated via motion compensation of previous images. The generated restored images may be used as the reference images for inter prediction of other images. Accordingly, at least one short-term reference image or at least one long-term reference image for inter prediction of the current image may be selected from among the restored images stored in the decoded picture buffer. The short-term reference image may be an image decoded immediately or recently before the current image according to a decoding order, whereas the long-term reference image may be an image decoded long before the current image but is selected and stored in the decoded picture buffer to be used as the reference image for inter prediction of other images.

Among the restored images stored in the decoded picture buffer, the short-term reference images and the long-term reference images are classified from each other. The long-term reference image is an image referable for inter prediction of a plurality of images, and is stored in the decoded picture buffer for a long period of time. On the other hand, the short-term reference images each referred to for inter prediction of a current image and a following image and required for every image may be updated, and thus the short-term reference images in the decoded picture buffer may be frequently updated. Accordingly, when new short-term reference images are stored in the decoded picture buffer, oldest short-term reference images among the pre-stored short-term reference images are sequentially deleted.

The inter prediction unit 12 may perform inter prediction on the current image by using the long-term reference image stored in the decoded picture buffer.

The output unit 14 may output the residual data and the motion vector of the current image generated via the inter prediction of the inter prediction unit 12.

The output unit 14 may determine least significant bit (LSB) information of picture order count (POC) information of the long-term reference image, as a long-term reference index indicating the long-term reference image. The output unit 14 may divide the POC information of the long-term reference image into most significant bit (MSB) information and the LSB information, and only output the LSB information as the long-term reference index indicating the long-term reference image.

The inter prediction unit 12 may determine the long-term reference image per slice. Accordingly, the output unit 14 may insert the LSB information of the POC information of the long-term reference image used for inter prediction of a current slice, as the long-term reference index, into a slice header. LSB information of POC information of reference images for blocks of the current slice may be inserted into the slice header and then transmitted.

The long-term reference image is determined according to slices, and the inter prediction may be performed according to blocks in the slice. In other words, the inter prediction unit 12 may perform the inter prediction according to blocks of the current slice by referring to the long-term reference image. Accordingly, a reference block is determined from the long-term reference image according to the blocks of the current slice, and a motion vector and residual data may be determined with respect to the reference block according to the blocks. Accordingly, the output unit 14 may output the motion vector and the residual data according to the blocks of the current slice.

Alternatively, the output unit 14 may divide difference information between POC information of the long-term reference image and POC information of the current image into MSB information and LSB information, and output the LSB information of the difference information as the long-term reference index.

The inter prediction unit 12 may perform inter prediction on the current image by referring to the short-term reference image. In this case, between MSB and LSB information of POC information of the short-term reference image, the output unit 14 may only output LSB information, as a short-term reference index indicating the short-term reference image.

The inter prediction apparatus 10 may include a central processor (not shown) that generally controls the inter prediction unit 12 and the output unit 14. Alternatively, the inter prediction unit 12 and the output unit 14 may each be operated by a self-processor (not shown), and the self-processors may mutually systematically operate such that the inter prediction apparatus 10 is operated. Alternatively, the inter prediction unit 12 and the output unit 14 may be controlled according to an external processor (not shown) of the inter prediction apparatus 10.

The inter prediction apparatus 10 may include one or more data storage units (not shown) where input and output data of the inter prediction unit 12 and the output unit 14 are stored. The inter prediction apparatus 10 may include a memory control unit (not shown) for controlling data input and output of a data storage unit.

Figure 1B:
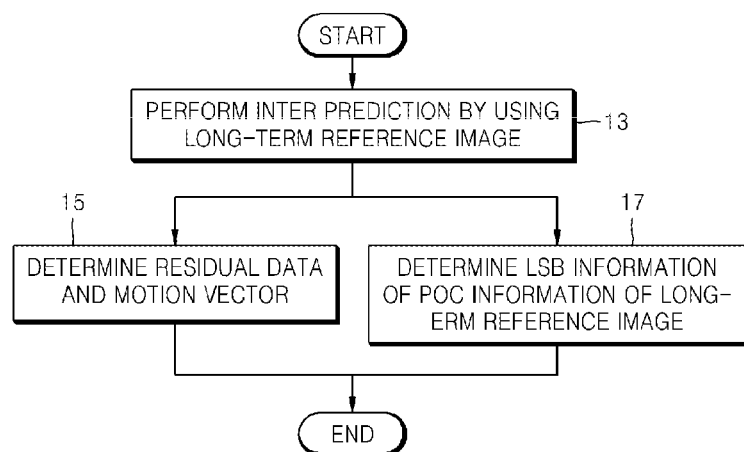
FIG. 1B is a flowchart illustrating an inter prediction method according to an embodiment of the present invention.

FIG. 1B is a flowchart illustrating an inter prediction method according to an embodiment of the present invention.

In operation 13, the inter prediction apparatus 10 may perform inter prediction on the current image by using the long-term reference image stored in the decoded picture buffer. In operation 15, the inter prediction apparatus 10 may determine the residual data and the motion vector of the current image according to the inter prediction. In operation 17, the inter prediction apparatus 10 may divide the POC information of the long-term reference image into the MSB information and the LSB information, and determine the LSB information of the POC information of the long-term reference image as the long-term reference index.

The residual data and the motion vector of the current image may be output, and the LSB information of the POC information of the long-term reference image may be output as information for indicating the long-term reference image of the current image, as the results of the inter prediction apparatus 10 performing the inter prediction on the current image by using the long-term reference image in operations 13 through 17.

Figure 2A:
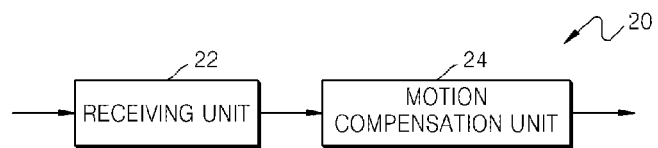
FIG. 2A is a block diagram of a motion compensation apparatus according to an embodiment of the present invention.

FIG. 2A is a block diagram of a motion compensation apparatus 20 according to an embodiment of the present invention.

The motion compensation apparatus 20 includes a receiving unit 22 and a motion compensation unit 24.

The receiving unit 22 may receive encoded image data, a motion vector, and a long-term reference index.

A motion vector and residual data between a current image and a reference image are generated as results of inter prediction. A process of restoring the current image by using the reference image, the residual data, and the motion vector is motion compensation. The motion compensation unit 24 may restore the current image by performing motion compensation by using the residual data and the motion vector of the current image received by the receiving unit 22.

The motion compensation unit 24 may restore the residual data of the current image by decoding the encoded image data. When the encoded image data is a quantized transformation coefficient, the motion compensation unit 24 may restore the residual data of the current image by performing inverse quantization and inverse transformation on the encoded image data, and then perform the motion compensation on the residual data.

In detail, the motion compensation unit 24 may perform motion compensation according to blocks of an image. A block may have a square shape, a rectangular, shape, or an arbitrary geometrical shape, and may be a coding unit of a tree structure of a prediction unit. As described above with reference to FIG. 1A, the block is not limited to a data unit having a predetermined size.

Accordingly, the receiving unit 22 may receive the encoded image data according to the blocks of the current image, and the motion compensation unit 24 may restore the residual data and the motion vector according to the blocks to perform the motion compensation using the residual data and the motion vector according to the blocks. The current image may be restored by performing the motion compensation on all blocks in an image.

The motion compensation unit 24 may read LSB information of POC information of a long-term reference image of the current image from the long-term reference index. The motion compensation unit 24 may determine the POC information of the long-term reference image by composing MSB information of the POC information of the long-term reference image and the LSB information read from the long-term reference index.

The motion compensation unit 24 may determine the long-term reference image corresponding to the determined POC information from among reference images stored in a decoded picture buffer. The motion compensation unit 24 may perform the motion compensation on the current image by using the motion vector and the residual data, based on the determined long-term reference image. The current image may be restored via the motion compensation.

The motion compensation unit 24 may predict MSB information of a second long-term reference image from MSB information of a first long-term reference image, from among a plurality of long-term reference images for the current image stored in the decoded picture buffer.

For example, the motion compensation unit 24 may compare LSB information of the POC information of the second long-term reference image and LSB information of the POC information of the first long-term reference image to determine whether the MSB information of the POC information of the second long-term reference image is higher than, lower than, or equal to the MSB information of the POC information of the first long-term reference image. Accordingly, the MSB information of the POC information of the second long-term reference image may be predicted from the MSB information of the POC information of the first long-term reference image. The motion compensation unit 24 may restore the POC information of the second long-term reference image by composing the LSB information of the POC information of the second long-term reference image, which is read from the received long-term reference index, and the predicted MSB information of the POC information of the second long-term reference image.

Alternatively, the motion compensation unit 24 may receive both the LSB information of the POC information of the long-term reference image and the MSB information of the POC information of the long-term reference image, as long-term reference indexes for the current image. In this case, the motion compensation unit 24 may restore the POC information of the long-term reference image by composing the LSB and MSB information of the POC information of the long-term reference image read from the received long-term reference indexes.

The motion compensation unit 24 may read LSB information of difference information between the POC information of the current image and the POC information of the long-term reference image, from the long-term reference index. Here, the motion compensation unit 24 may restore the difference information by composing the MSB information and the LSB information. The motion compensation unit 24 may determine a POC number of the long-term reference image by subtracting or adding the restored difference information from or to the POC information of the current image.

The receiving unit 22 may parse the long-term reference index of a current slice from a slice header. LSB information of POC information of reference images for blocks of the current slice may be parsed from the slice header.

Alternatively, the receiving unit 22 may receive a short-term reference index for inter prediction of the current image. LSB information of POC information of the short-term reference image for inter prediction of the current image may be read from the short-term reference index. The motion compensation unit 24 may determine the POC information of the short-term reference image by using the read LSB information of the POC information of the short-term reference image and MSB information of the short-term reference image. The motion compensation unit 24 may perform motion compensation on the current image by using the short-term reference image corresponding to the determined POC information from among reference images stored in the decoded picture buffer.

Figure 2B:
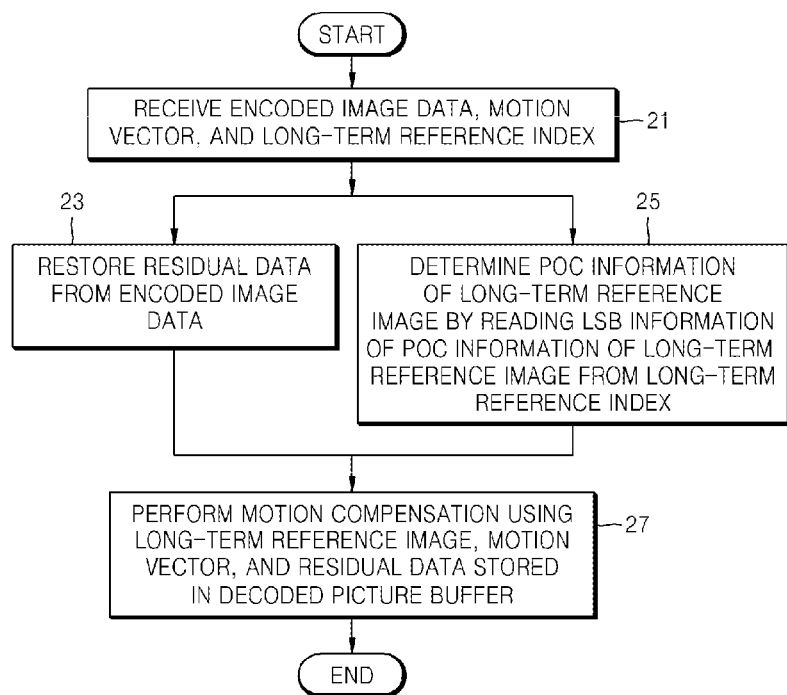
FIG. 2B is a flowchart illustrating a motion compensation method according to an embodiment of the present invention.

FIG. 2B is a flowchart illustrating a motion compensation method according to an embodiment of the present invention.

In operation 21, the motion compensation apparatus 20 may receive encoded image data, a motion vector, and a long-term reference index. In operation 23, the motion compensation apparatus 20 may restore residual data of the current image by decoding the encoded image data. In operation 25, the motion compensation apparatus 20 may read the LSB information of the POC information of the long-term reference image of the current image from the long-term reference index, and determine the POC information of the long-term reference image by using the MSB and LSB information of the POC information of the long-term reference image. In operation 27, the motion compensation apparatus 20 may restore the current image by performing motion compensation by using the motion vector and the residual data, based on the long-term reference image corresponding to the POC information determined in operation 25, from among the reference images stored in the decoded picture buffer.

In other words, the motion compensation apparatus 20 may select the long-term reference image corresponding to the POC information determined in operation 25 from among restored images stored in the decoded picture buffer, and determine a reference region indicated by the motion vector from the selected long-term reference image. The motion compensation apparatus 20 may perform motion compensation for determining a current region by composing the residual data to the determined reference region. The motion compensation apparatus 20 may restore the current image by performing the motion compensation according to blocks of the current image.

According to the inter prediction apparatus 10 described above with reference to FIGS. 1A and 1B and the motion compensation apparatus 20 described above with reference to FIGS. 2A and 2B, the LSB information of the POC information of the long-term reference image may be used as a long-term reference index indicating the long-term reference image from among the reference images used for inter prediction of an image. The long-term reference image may be indicated by using the POC information without having to use a separate image number for the long-term reference image to identify the long-term reference image. Accordingly, no storage space for storing the separate image number for the long-term reference to image may be spared. In addition, a range of indexes indicating the long-term reference images may be infinite.

FIG. 3 is a table showing the LSB information and the MSB information of the POC information of the long-term reference image, according to an embodiment of the present invention.

The inter prediction apparatus 10 and the motion compensation apparatus 20 use the POC information of the long-term reference image to indicate the long-term reference image. Also, the POC information is divided into the MSB information and the LSB information. A maximum size of the LSB information may be pre-set. In FIG. 3, a range of the LSB information is from 0 to 15, and thus the maximum size of the LSB information is 16, i.e., 4 bits.

When the POC information is divided by the maximum size of the LSB information, a quotient may be the MSB information and a remainder may be the LSB information.

Accordingly, while the POC information increases from 0 to 15, the MSB information of the POC information is 0 and the LSB information increases from 0 to 15. Also, while the POC information increases from 16 to 31, the MSB information is 1 and the LSB information increases from 0 to 15. Also, while the POC information increases from 32 to 47, the MSB information is 2 and the LSB information increases from 0 to 15. Also, when the POC information is 48, the MSB information is 3 and the LSB information is 0.

In FIG. 3, the MSB information 0, 1, 2, and 3 are all hexadecimal numbers, and respectively denote 0, 16, 32, and 48 in decimal numbers.

When the POC information increases from 15 to 16, 31 to 32, or 47 to 48, the LSB information returns from 15 to 0. In other words, the LSB information may wrap around from a maximum value to a minimum value whenever the LSB information increases to a multiple of a maximum size while sequentially increasing.

When only the LSB information is additionally determined after the MSB information of the POC information is pre-checked, the POC information may be determined by combining the MSB information and the LSB information.

Accordingly, the inter prediction apparatus 10 may output only the LSB information of the POC information of the long-term reference image so as to output the long-term reference index indicating the long-term reference image. The motion compensation apparatus 20 may read the LSB information of the POC information of the long-term reference image from the reference index received from the inter prediction apparatus 10, and restore the POC information of the long-term reference image by combining the LSB information to the pre-obtained MSB information.

Alternatively, the long-term reference index may denote the LSB information of the difference information between the POC information of the current image and the POC information of the reference image. Here, the motion compensation apparatus 20 may read the LSB information (DeltaPOCLtM1Lsb) of the difference information between the POC information of the current image and the POC information of the long-term reference image from the long-term reference index. The motion compensation apparatus 20 may determine the difference information (DeltaPOCLtM1) between the POC information of the current image and the POC information of the long-term reference image by combining the pre-determined MSB information (DeltaPOCLtM1 Msb) and the read LSB information (DeltaPOCLtM1 Lsb) (DeltaPOCLtM1=DeltaPOCLtM1Msb+DeltaPOCLtM1Lsb). Also, when the determined difference information (DeltaPOCLtM1) is subtracted from the POC information (PicOrderCnt) of the current image, the POC information (RefPicSetLtCurr) of the long-term reference image of the current image may be determined (RefPicSetLtCurr=PicOrderCnt−DeltaPOCLtM1).

The motion compensation apparatus 20 may receive the MSB information of the POC information of the long-term reference image from the inter prediction apparatus 10. Here, the motion compensation apparatus 20 may restore the POC information of the long-term reference image by combining the received MSB information and the LSB information of the POC information of the long-term reference image.

Alternatively, the motion compensation apparatus 20 may determine MSB information of POC information of a current long-term reference image based on MSB information of POC information of a pre-determined previous long-term reference image among a plurality of long-term reference images. For example, the MSB information (POCUM1Msb) of the POC information of the current long-term reference image may i) higher by a maximum size (MaxPOCLtLsb) of LSB information than the MSB information (prevPOCUM1Msb) of the POC information of the previous long-term reference image, ii) lower by the maximum size (MaxPOCLtLsb) of the LSB information than the MSB information (prevPOCUM1Msb) of the POC information of the previous long-term reference image, or iii) equal to the MSB information (prevPOCUM1Msb) of the POC information of the previous long-term reference image.

For example, the motion compensation apparatus 20 may compare the LSB information of the POC information of the previous long-term reference image and the LSB information of the POC information of the current long-term reference image to determine whether the MSB information of the POC information of the current long-term reference image is higher than or equal to the MSB information of the POC information of the previous long-term reference image.

According to a first condition, the LSB information (POCULsbM1) of the POC information of the current long-term reference image may be smaller than the LSB information (prevPOCULsbM1) of the POC information of the previous long-term reference image, and a distance between the LSB information of the POC information of the current long-term reference image and the previous long-term reference image is higher than or equal to a half (MaxPOCLtLsb/2) of the maximum size of the LSB information. When the first condition is satisfied, the MSB information (POCUM1Msb) of the POC information of the current long-term reference image may be higher by the maximum size (MaxPOCLtLsb) of the LSB information than the MSB information (prevPOCUM1Msb) of the POC information of the previous long-term reference image.

[Relational Expression according to First Condition]

```
if((POCLtM1Lsb<prevPOCLtM1Lsb)&&
    ((prevPOCLtM1Lsb−POCLtM1Lsb)>=(MaxPO-
    CLtLsb/2)))

POCLtM1Msb=prevPOCLtM1Msb+MaxPOCLtLsb
```

In other words, in the first condition, it is determined that the LSB information is wrapped around in an increasing direction from the POC information of the previous long-term reference image to the POC information of the current long-term reference image, and thus the MSB information of the POC information of the current long-term reference image is relatively increased.

According to a second condition, the LSB information (POCULsbM1) of the POC information of the current long-term reference image may be higher than the LSB information (prevPOCULsbM1) of the POC information of the previous long-term reference image, and a distance between the LSB information of the POC information of the current long-term reference image and the previous long-term reference image is higher than or equal to the half (MaxPOCLtLsb/2) of the maximum size of the LSB information. When the second condition is satisfied, the MSB information (POCUM1Msb) of the POC information of the current long-term reference image may be lower by the maximum size (MaxPOCLtLsb) of the LSB information than the MSB information (prevPOCUM1Msb) of the POC information of the previous long-term reference image.

[Relational Expression according to Second Condition]

```
if((POCLtM1Lsb>prevPOCLtM1Lsb)&&
    ((prevPOCLtM1Lsb−POCLtM1Lsb)>=(MaxPO-
    CLtLsb/2)))

POCLtM1Msb=prevPOCLtM1Msb−MaxPOCLtLsb
```

In other words, in the second condition, it is determined that the LSB information is wrapped around in a decreasing direction from the POC information of the previous long-term reference image to the POC information of the current long-term reference image, and thus the MSB information of the POC information of the current long-term reference image is relatively decreased.

A third condition is applied when the first and second conditions cannot be applied. In the third condition, the MSB information (POCUM1Msb) of the POC information of the current long-term reference image may be equal to the MSB information (prevPOCUM1Msb) of the POC information of the previous long-term reference image.

[Relational Expression according to Third Condition]

```
POCLtM1Msb=prevPOCLtM1Msb
```

The MSB information (POCLtM1Msb) of the POC information of the current long-term reference image is determined by considering all of the first through third conditions, and the POC information (POCLtM1) of the current long-term reference image may be determined by combining the LSB information (POCLtM1Lsb) of the POC information of the current long-term reference image, which is read form the long-term reference index, to the determined MSB information (POCLtM1Msb). (POCLtM1=POCLtM1Msb+ POCLtM1Lsb)

Even when the LSB information of the difference information between POC information of the current image and the long-term reference image described above is used as the long-term reference index, it may be determined whether LSB information of difference information between POC information of the current image and the current long-term reference image is higher, lower, or equal based on LSB information of the difference information between POC information of the current image and the pre-determined previous long-term reference image.

FIG. 4 is a block diagram of a video encoding apparatus 40 that performs inter prediction, according to an embodiment of the present invention.

The video encoding apparatus 40 includes a decoded picture buffer 42, an inter prediction unit 44, a transformation quantization unit 46, and an entropy encoding unit 48.

The decoded picture buffer 42 stores previously restored images. Reference images for inter prediction of an image may be determined from among the restored images stored in the decoded picture buffer 42. The inter prediction unit 44 may generate residual data by performing inter prediction on a current image by using a long-term reference image selected from among the restored images stored in the decoded picture buffer 42. The inter prediction unit 44 may perform the same operations as the inter prediction apparatus 10 described above.

The transformation quantization unit 46 may generate a quantized transformation coefficient by performing transformation and quantization on the residual data generated by the inter prediction unit 44. The entropy encoding unit 48 may perform entropy encoding on symbols including the quantized transformation coefficient and a motion vector.

Accordingly, the video encoding apparatus 40 may perform inter prediction according to blocks of images of a video, generate a quantized transformation coefficient according to the blocks by performing transformation and quantization on residual data generated according to blocks via inter prediction, and output a bitstream by performing entropy encoding on the quantized transformation coefficient, thereby encoding the video.

The entropy encoding unit 48 may output the motion vector determined via the inter prediction, together with the quantized transformation coefficient. Accordingly, the entropy encoding may be performed on symbols including the quantized transformation coefficient and the motion vector.

Also, the long-term reference index determined by the inter prediction unit 44 may be output as the symbol. The long-term reference index may be the LSB information of the POC information of the long-term reference image. Accordingly, the entropy encoding unit 48 may perform the entropy encoding on the symbol including the quantized transformation coefficient, the motion vector, and the long-term reference index. The entropy encoding unit 48 may output the bitstream generated according to the entropy encoding.

Also, the video encoding apparatus 40 may generate the restored image of the current image by performing motion compensation using the residual data and the motion vector of the current image by referring to the restored images stored in the decoded picture buffer 42, in order to generate the reference image for inter prediction of other images. Accordingly, the video encoding apparatus 40 may perform operations of the motion compensation apparatus 20 to perform motion compensation.

In other words, the video encoding apparatus 40 may read the LSB information of the POC information from the long-term reference index and restore the POC information of the long-term reference image by using the read LSB information, so as to select the long-term reference image for motion compensation. The video encoding apparatus 40 may select the long-term reference image corresponding to the restored POC information from among the restored images stored in the decoded picture buffer 42, and perform the motion compensation using the residual data and the motion vector of the current image based on the selected long-term reference image.

In order to output a video encoding result, the video encoding apparatus 40 may operate in cooperation with a video encoding processor installed therein or an external video encoding processor so as to perform video encoding operations including intra prediction, inter prediction, transformation, and quantization. The video encoding operations may be performed not only when the video encoding apparatus 40 includes a separate internal video encoding processor, but also when the video encoding apparatus 40 or a central processing apparatus or graphic processing apparatus for controlling the video encoding apparatus 40 includes a video encoding processing module.

FIG. 5 is a block diagram of a video decoding apparatus 50 that performs motion compensation, according to an embodiment of the present invention.

The video decoding apparatus 50 may include a receiving unit 52, an inverse quantization and inverse transformation unit 54, a decoded picture buffer 56, a motion compensation unit 58, and an in-loop filtering unit 59.

The receiving unit 52 may receive a video stream and perform entropy decoding on the received video stream to parse encoded image data.

The inverse quantization and inverse transformation unit 54 may restore residual data by performing inverse quantization and inverse transformation on the encoded image data parsed by the receiving unit 52.

The receiving unit 52 may parse a motion vector from the vide stream. The decoded picture buffer 56 may store the previously restored images that may be used as a reference image for motion compensation of other images. The motion compensation unit 58 may perform motion compensation using the motion vector and the residual data based on the reference images stored in the decoded picture buffer 56.

The in-loop filtering unit 59 may perform deblocking filtering on the restored image restored and output by the motion compensation unit 58. The in-loop filtering unit 59 may output a final restored image. Also, an output image of the in-loop filtering unit 59 may be stored in the decoded picture buffer 56 and used as a reference image for motion compensation of a following image.

The video decoding apparatus 50 may restore a video by performing decoding according to blocks of images of the video. The receiving unit 52 may parse the encoded image data and the motion vector according to the blocks, and the inverse quantization and inverse transformation unit 54 may restore the residual data according to the blocks by performing inverse quantization and inverse transformation according to the blocks. The motion compensation unit 58 may determine a reference block indicated by the motion vector from among the reference images according to the blocks, and generate restored blocks by composing the reference block and the residual data.

The receiving unit 52 may parse the long-term reference index from the video stream. The motion compensation unit 58 may perform the same operations as the motion compensation apparatus 20 described above. The motion compensation unit 58 may read the LSB information of the POC information of the long-term reference image of the current image from the long-term reference index, and determine the POC information of the long-term reference image by using the MSB and LSB information of the long-term reference image. The motion compensation unit 58 may perform motion compensation using the motion vector and the residual data based on the long-term reference image corresponding to the POC information from among the restored images stored in the decoded picture buffer 56. In other words, the motion compensation unit 58 may determine the reference block indicated by the motion vector from among the long-term reference image, and restore the current block by composing the reference block and the residual data.

In order to output a video decoding result, the video decoding apparatus 50 may operate in cooperation with a video decoding processor installed therein or an external video decoding processor to perform video decoding operations including inverse quantization, inverse transformation, intra prediction, and motion compensation. The video decoding operations may be performed not only when the video decoding apparatus 50 includes a separate internal video decoding processor, but also when the video decoding apparatus 50 or a central processing apparatus or graphic processing apparatus for controlling the video decoding apparatus 50 includes a video decoding processing module.

As described above, the inter prediction apparatus 10 may spilt blocks of video data into coding units having a tree structure, and prediction units for inter prediction of coding units may be used. Hereinafter, a video encoding method, a video encoding apparatus, a video decoding method, and a video decoding apparatus based on coding units having a tree structure and transformation units will be described with reference to FIGS. 6 through 18.

Figure 6:
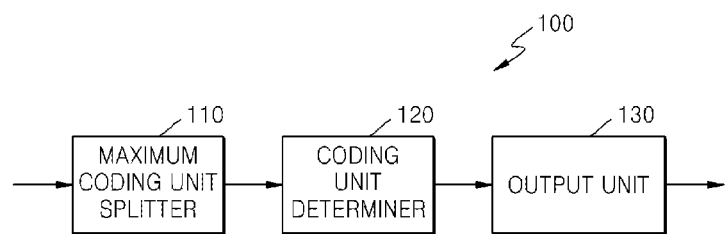
FIG. 6 is a block diagram of a video encoding apparatus based on coding units according to a tree structure, according to an embodiment of the present invention.

FIG. 6 is a block diagram of a video encoding apparatus 100 based on coding units according to a tree structure, according to an embodiment of the present invention.

The video encoding apparatus 100 involving video prediction based on coding units according to a tree structure includes a maximum coding unit splitter 110, a coding unit determiner 120, and an output unit 130.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an embodiment of the present invention may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an embodiment of the present invention may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an embodiment of the present invention include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of splitting times from a maximum coding unit to a minimum coding unit. A first maximum depth according to an embodiment of the present invention may denote the total number of splitting times from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to embodiments of the present invention, will be described in detail later with reference to FIGS. 8 through 18.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an embodiment of the present invention is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information, which are described above with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 6 may perform operations of the inter prediction apparatus 10 of FIG. 1A or the video encoding apparatus 40 of FIG. 4.

The coding unit determiner 120 and the output unit 130 may perform operations of the inter prediction apparatus 10 or the inter prediction unit 44. A prediction unit for inter prediction may be determined according to coding units having a tree structure for each maximum coding unit, and inter prediction may be performed per prediction unit.

Specifically, when the long-term reference image is used for inter prediction of a current prediction unit in an inter mode, the POC information of the long-term reference image may be used as the long-term reference index for identifying the long-term reference images stored in the decoded picture buffer. The output unit 130 may output the LSB information of the POC information of the long-term reference image, as the reference index. Also, the reference index indicating the long-term reference image to be referred to in the current slice may be stored in the slice header. Accordingly, the output unit 130 may transmit the LSB information of the POC information of the long-term reference image as the reference index through the slice header.

Also, the coding unit determiner 120 may perform motion compensation for a current image by referring to a previous restored image stored in the decoded picture buffer so as to generate the reference image for inter prediction of other images. Accordingly, the coding unit determiner 120 may perform operations of the video decoding apparatus 50 described with reference to FIG. 5.

In other words, the coding unit determiner 120 may also read the LSB information of the POC information from the long-term reference index and restore the POC information of the long-term reference image by using the read LSB information so as to select the long-term reference image for motion compensation. The coding unit determiner 120 may select the long-term reference image corresponding to the restored POC information from among restored images stored in the decoded picture buffer, and perform motion compensation using the motion vector and the residual data based on the selected long-term reference image.

Since the coding unit determiner 120 performs motion compensation according to prediction units, the coding unit determiner 120 may determine a reference prediction unit indicated by a motion vector of a current prediction unit from the selected long-term reference image, and restore the current prediction unit by composing residual data of the current prediction unit and the determined reference prediction unit. A coding unit may be restored by restoring prediction units, a maximum coding unit may be restored by restoring coding units, and an image may be restored by restoring maximum coding units.

Figure 7:
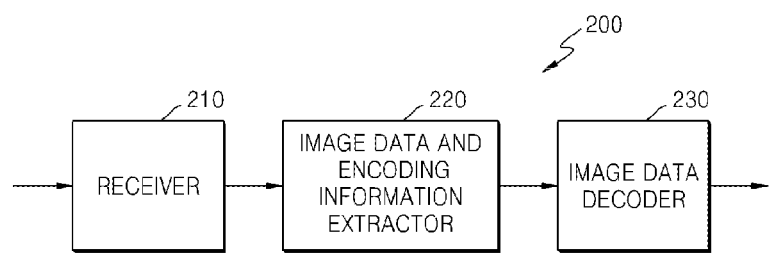
FIG. 7 is a block diagram of a video decoding apparatus based on coding units according to a tree structure, according to an embodiment of the present invention.

FIG. 7 is a block diagram of a video decoding apparatus 200 based on coding units having a tree structure, according to an embodiment of the present invention.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 6 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the image data decoder 230 of the video decoding apparatus 200 of FIG. 7 may perform operations of the motion compensation apparatus 20 of FIG. 2A or the motion compensation unit 58 of FIG. 5.

The image data and encoding information extractor 220 may parse the long-term reference index from the received bitstream. The long-term reference index may be parsed from the slice header.

The image data decoder 230 may determine the prediction unit for inter prediction and perform inter prediction for each prediction unit, according to coding units having a tree structure, for each maximum coding unit.

Specifically, the image data decoder 230 may read the LSB information of the POC information of the long-term reference image from the long-term reference index. The image data decoder 230 may restore the POC information of the long-term reference image by combining the read LSB information and the pre-determined MSB information of the POC information of the long-term reference image.

Since the image data decoder 230 performs motion compensation according to prediction units, the image data decoder 230 may determine the reference prediction unit indicated by the motion vector of the current prediction unit from the long-term reference image, and restore the current prediction unit by composing the residual data of the current prediction unit to the reference prediction unit. The coding unit may be restored by restoring the prediction units, the maximum coding unit may be restored by restoring the coding units, and the image may be restored by restoring the maximum coding units.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 8:
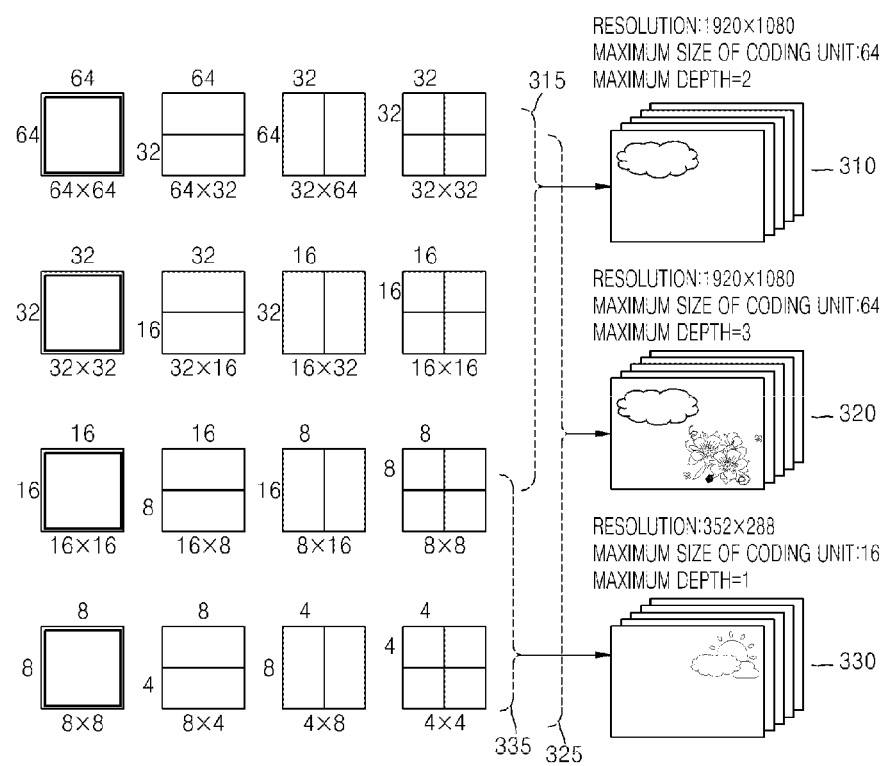
FIG. 8 is a diagram for describing a concept of coding units according to an embodiment of the present invention.

FIG. 8 is a diagram for describing a concept of coding units according to an embodiment of the present invention.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 8 denotes a total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 9:
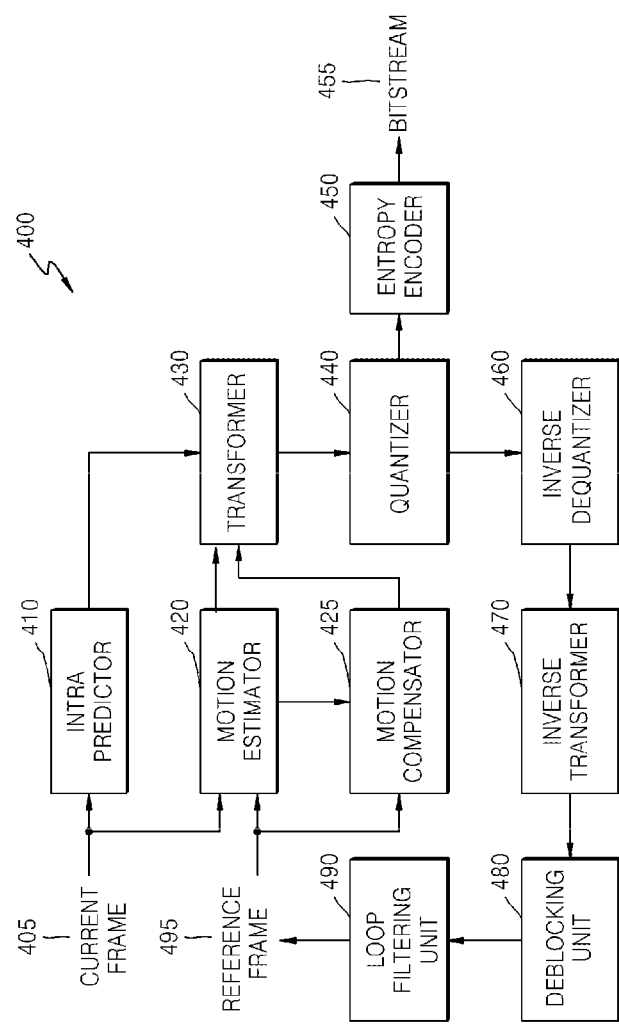
FIG. 9 is a block diagram of an image encoder based on coding units, according to an embodiment of the present invention.

FIG. 9 is a block diagram of an image encoder 400 based on coding units, according to an embodiment of the present invention.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Specifically, when the motion estimator 420 performs the inter prediction using the long-term reference frame, the POC information of the long-term reference frame may be output as the long-term reference index. The entropy encoder 450 may encode and output the LSB information of the POC information of the long-term reference frame, as the long-term reference index. The LSB information of the POC information of the long-term reference frames for the prediction units of the current slice may be included in the slice header and then transmitted.

The motion compensator 425 may also determine the POC information of the long-term reference frame by using the LSB information of the POC information read from the long-term reference index. The motion compensation unit 425 may select the long-term reference frame corresponding to the restored POC information from the reference frames stored in the decoded picture buffer, and perform motion compensation using the residual data and the motion vector of the current frame based on the selected long-term reference frame.

Figure 10:
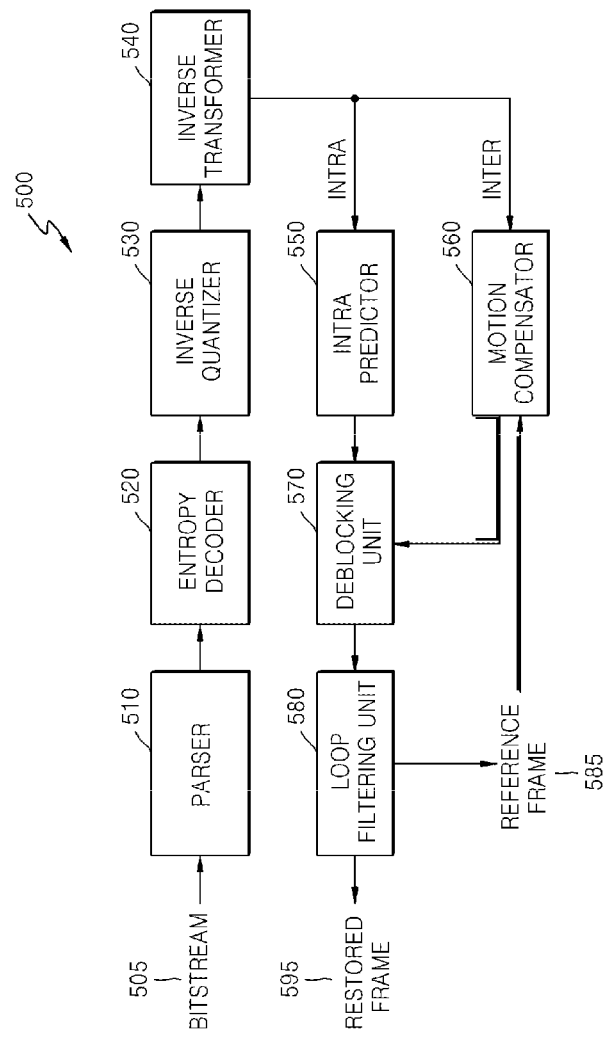
FIG. 10 is a block diagram of an image decoder based on coding units, according to an embodiment of the present invention.

FIG. 10 is a block diagram of an image decoder 500 based on coding units, according to an embodiment of the present invention.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Specifically, the parser 510 may parse the long-term reference index from the bitstream 505. The LSB information of POC information of the long-term reference images for the prediction units of the current slice may be parsed from the slice header. The motion compensator 560 may restore the POC information of the current long-term reference image by combining the LSB and MSB information of the POC information of the current long-term reference image, and determine the current long-term reference image corresponding to the restored POC information from among the long-term reference images stored in the decoded picture buffer. The motion compensator 560 may determine the reference prediction unit indicated by the motion vector for the current prediction unit from the current long-term reference image, and restore the current prediction unit by combining the reference prediction unit and the residual data of the current prediction unit.

Figure 11:
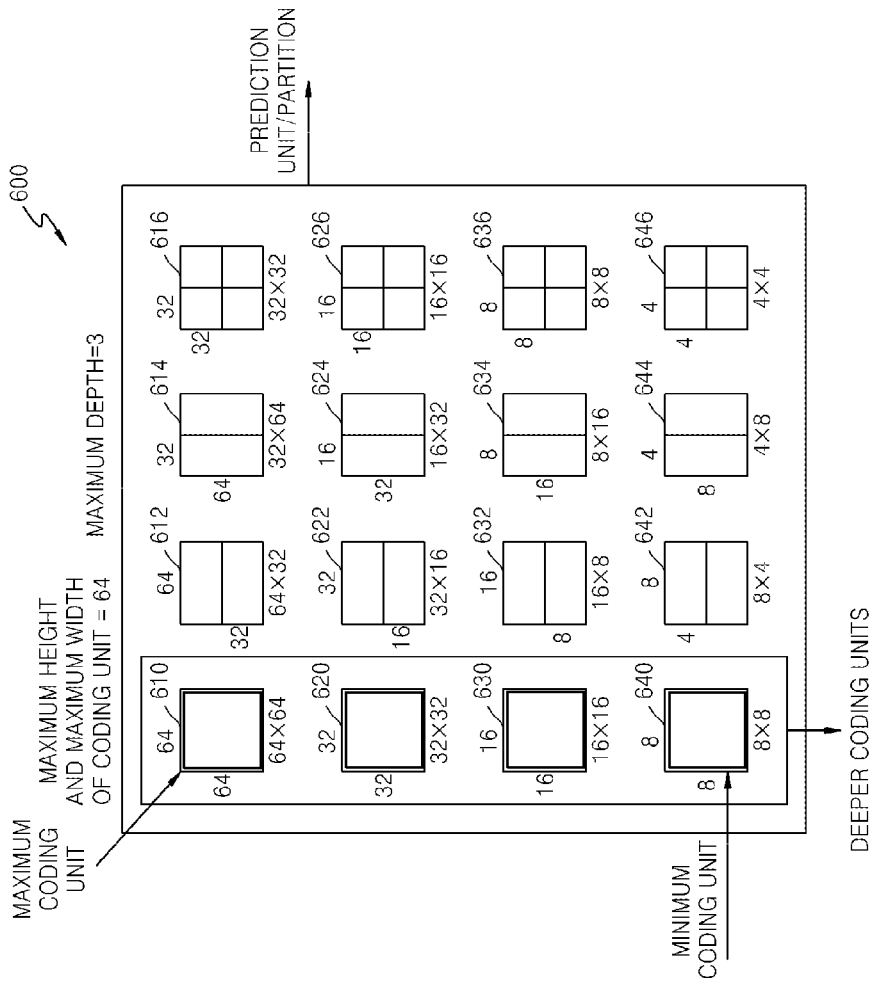
FIG. 11 is a diagram illustrating deeper coding units according to depths, and partitions, according to an embodiment of the present invention.

FIG. 11 is a diagram illustrating deeper coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment of the present invention, the maximum height and the maximum width of the coding units are each 64, and the maximum depth is 4. In this case, the maximum depth refers to a total number of times the coding unit is split from the maximum coding unit to the minimum coding unit.

Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 12:
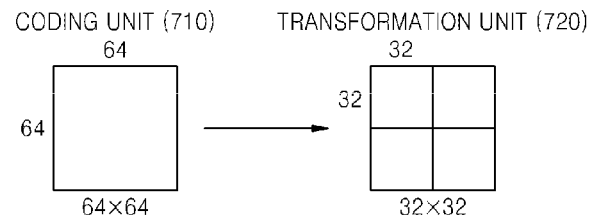
FIG. 12 is a diagram for describing a relationship between a coding unit and transformation units, according to an embodiment of the present invention.

FIG. 12 is a diagram for describing a relationship between a coding unit 710 and transformation units 720, according to an embodiment of the present invention.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 13:
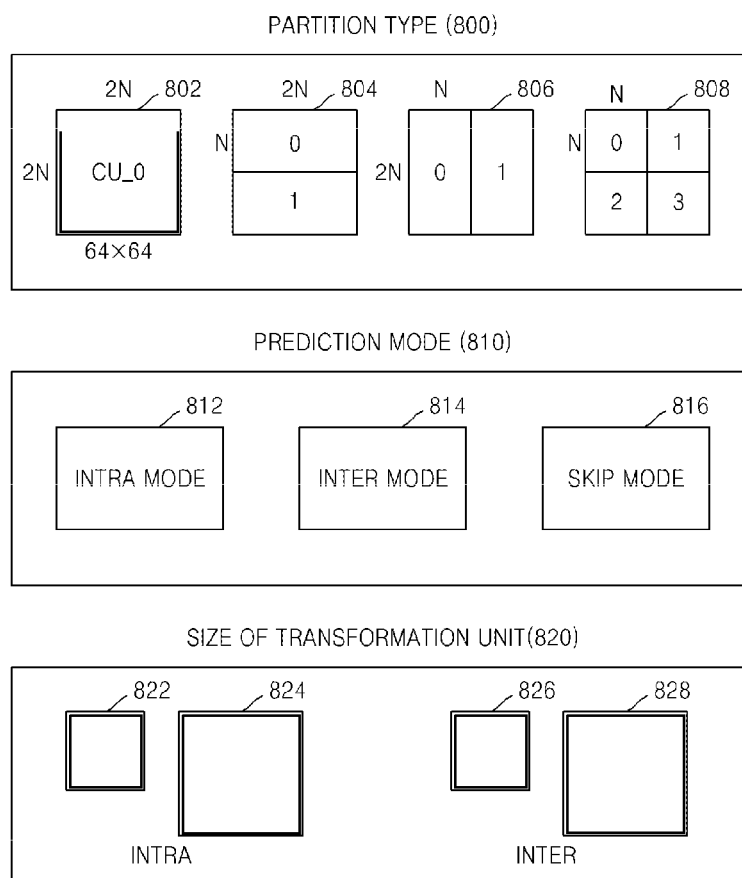
FIG. 13 is a diagram for describing encoding information of coding units corresponding to a coded depth, according to an embodiment of the present invention.

FIG. 13 is a diagram for describing encoding information of coding units corresponding to a coded depth, according to an embodiment of the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 14:
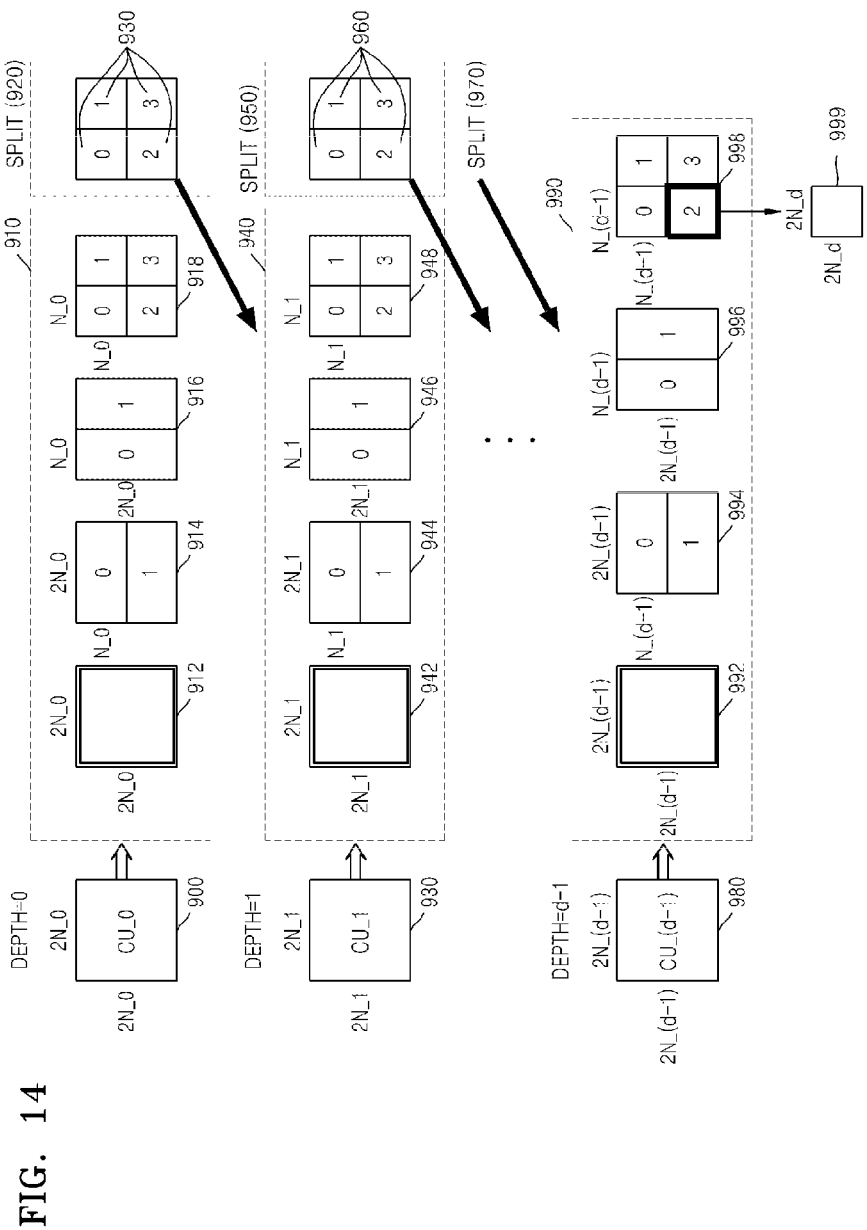
FIG. 14 is a diagram of deeper coding units according to depths, according to an embodiment of the present invention.

FIG. 14 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 14 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an embodiment of the present invention may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 15:
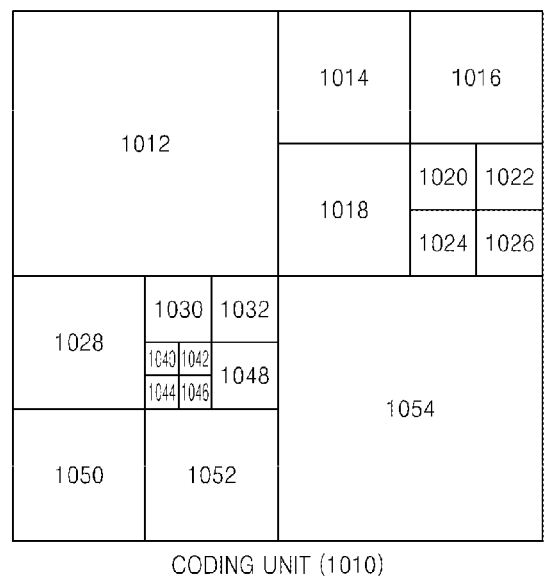
FIGS. 15 through 17 are diagrams for describing a relationship between coding units, prediction units, and transformation units, according to an embodiment of the present invention.
Figure 16:
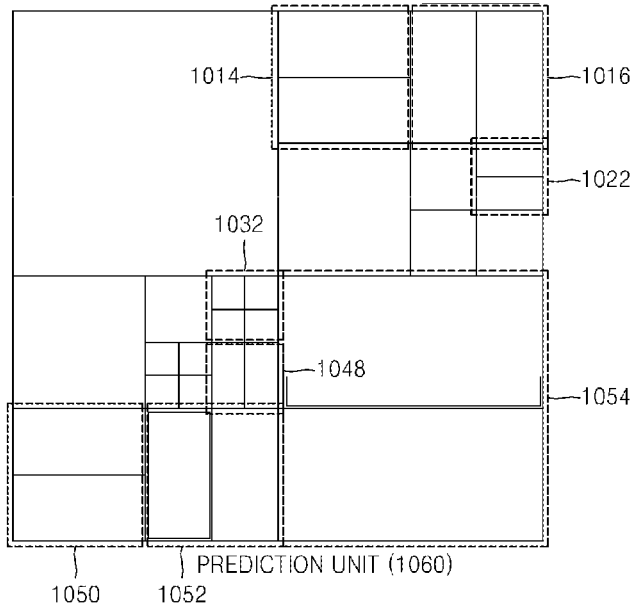
Figure 17:
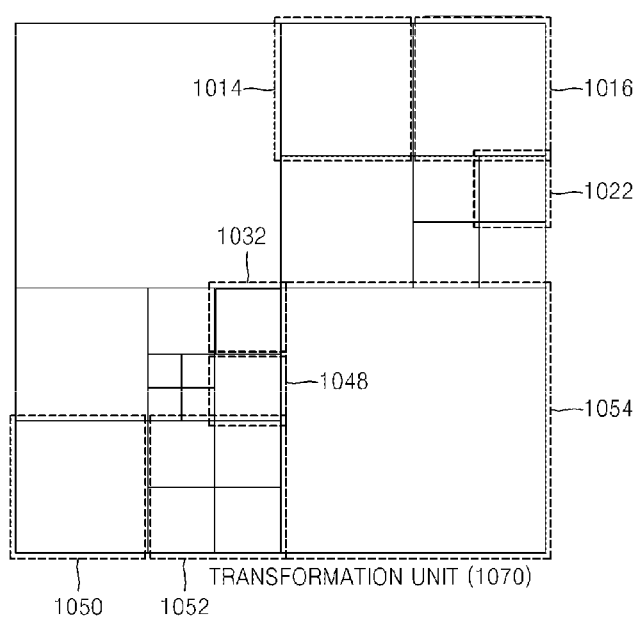

FIGS. 15 through 17 are diagrams for describing a relationship between coding units 1010, prediction units 1060, and transformation units 1070, according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the

TABLE 1

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | Repeatedly |
| Intra Inter | Symmetrical Partition Type | Asymmetrical Partition Type | Split Information 0 of Transformation Unit | Split Information 1 of Transformation Unit | Encode Coding Units |
| Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 18:
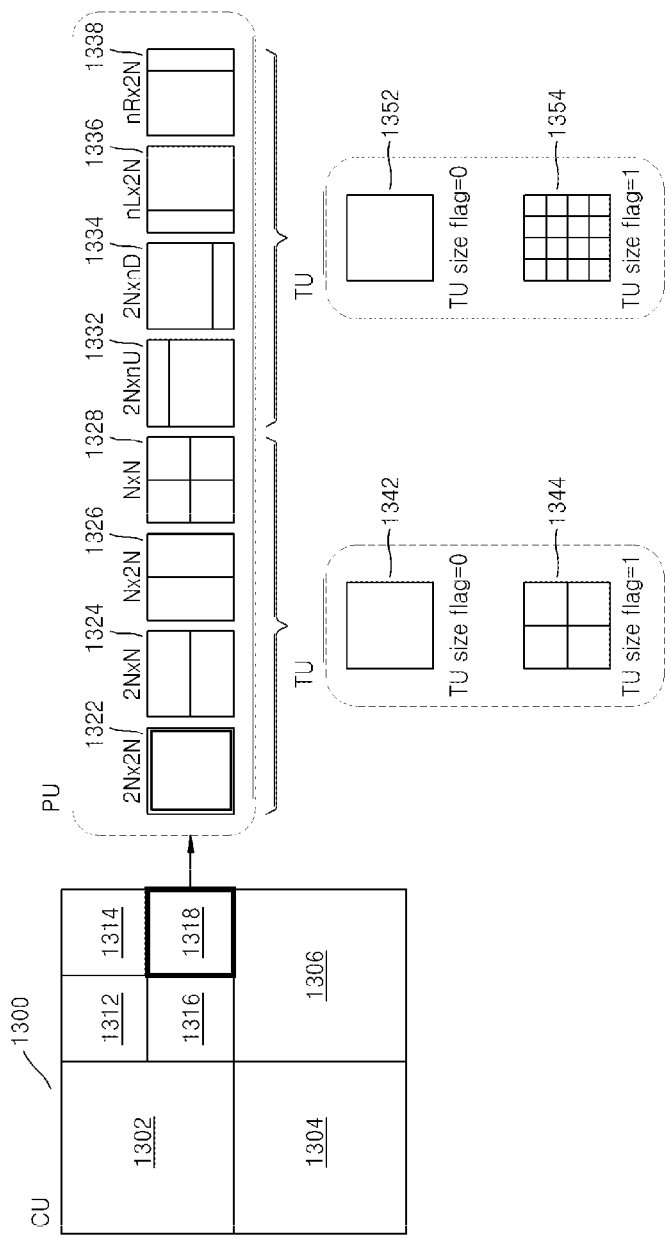
FIG. 18 is a diagram for describing a relationship between a coding unit, a prediction unit, and a transformation unit, according to encoding mode information of Table 1.

FIG. 18 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 18, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an embodiment according to the present invention, together with a maximum size and minimum size of the transformation unit. The video encoding apparatus 100 is to capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize=max(MinTransformSize,RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment according to the present invention, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=min(MaxTransformSize,PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=min(MaxTransformSize,PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units having a tree structure as described with reference to FIGS. 6 through 18, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The embodiments according to the present invention may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope according to the present invention as defined by the following claims.

As programs for realizing the inter prediction method, the motion compensation method, the video encoding method, and the video decoding method described with reference to FIGS. 1 through 18 are stored in the computer-readable recording media, an independent computer system may easily realize operations according to the programs stored in the computer-readable recording media.

For convenience of description, the inter prediction method and the video encoding method described with reference to FIGS. 1 through 18, will be collectively referred to as a 'video encoding method according to the present invention'. In addition, the motion compensation method and the video decoding method described with reference to FIGS. 1 through 18, will be referred to as a 'video decoding method according to the present invention'.

Also, a video encoding apparatus including the inter prediction apparatus 10, the video encoding apparatus 40, the video encoding apparatus 100, or the image encoder 400, which has been described with reference to FIGS. 1 through 18, will be referred to as a 'video encoding apparatus according to the present invention'. In addition, a video decoding apparatus including the motion compensation apparatus 20, the video decoding apparatus 50, the video decoding apparatus 200, or the image decoder 500, which has been descried with reference to FIGS. 1 through 18, will be referred to as a 'video decoding apparatus according to the present invention'.

A computer-readable recording medium storing a program, e.g., a disc 26000, according to an embodiment of the present invention will now be described in detail.

Figure 19:
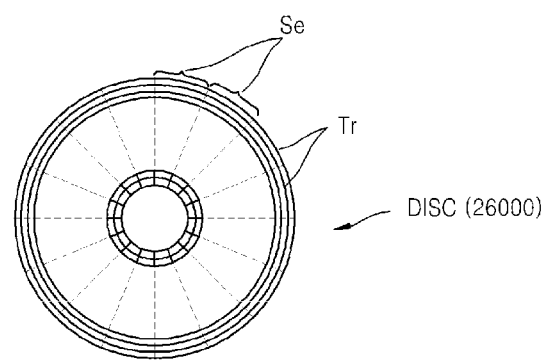
FIG. 19 is a diagram of a physical structure of a disc in which a program is stored, according to an embodiment of the present invention.

FIG. 19 is a diagram of a physical structure of the disc 26000 in which a program is stored, according to an embodiment of the present invention. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the inter prediction method, the motion compensation method, the video encoding method, and the video decoding method described above may be assigned and stored.

A computer system embodied using a storage medium that stores a program for executing the video encoding method and the video decoding method as described above will now be described with reference to FIG. 20.

Figure 20:
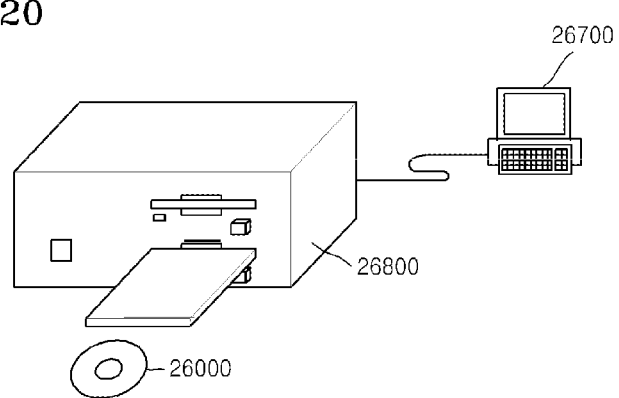
FIG. 20 is a diagram of a disc drive for recording and reading a program by using a disc.

FIG. 20 is a diagram of a disc drive 26800 for recording and reading a program by using the disc 26000. A computer system 27000 may store a program that executes at least one of a video encoding method and a video decoding method according to an embodiment of the present invention, in the disc 26000 via the disc drive 26800. To run the program stored in the disc 26000 in the computer system 27000, the program may be read from the disc 26000 and be transmitted to the computer system 27000 by using the disc drive 26800.

The program that executes at least one of a video encoding method and a video decoding method according to an embodiment of the present invention may be stored not only in the disc 26000 illustrated in FIG. 19 or 20 but also in a memory card, a ROM cassette, or a solid state drive (SSD).

A system to which the video encoding method and a video decoding method described above are applied will be described below.

Figure 21:
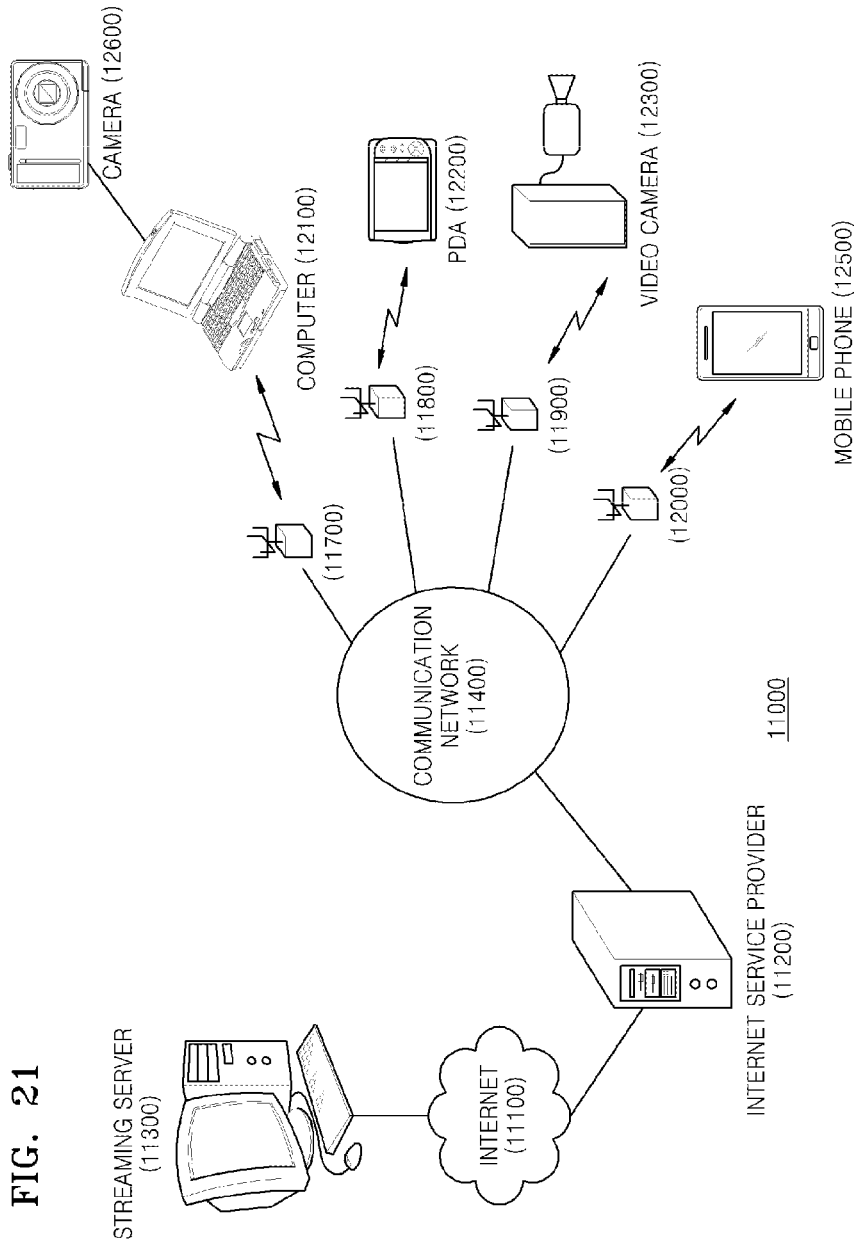
FIG. 21 is a diagram of an overall structure of a content supply system for providing a content distribution service.

FIG. 21 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 21, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an embodiment of the present invention.

The mobile phone 12500 included in the content supply system 11000 according to an embodiment of the present invention will now be described in greater detail with referring to FIGS. 22 and 23.

Figure 22:
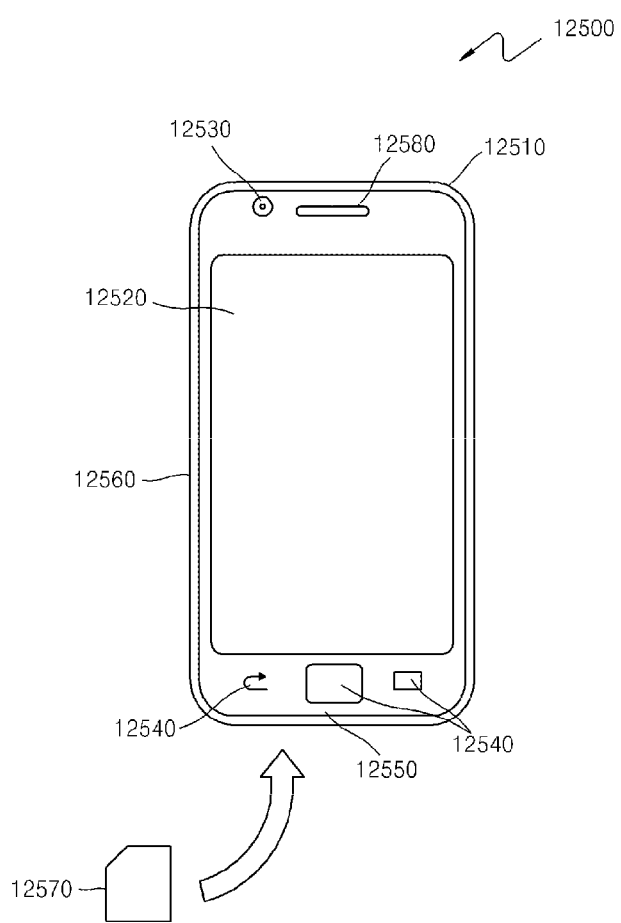
FIGS. 22 and 23 are diagrams respectively of an external structure and an internal structure of a mobile phone to which a video encoding method and a video decoding method are applied, according to an embodiment of the present invention.

FIG. 22 illustrates an external structure of the mobile phone 12500 to which a video encoding method and a video decoding method are applied, according to an embodiment of the present invention. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 23:
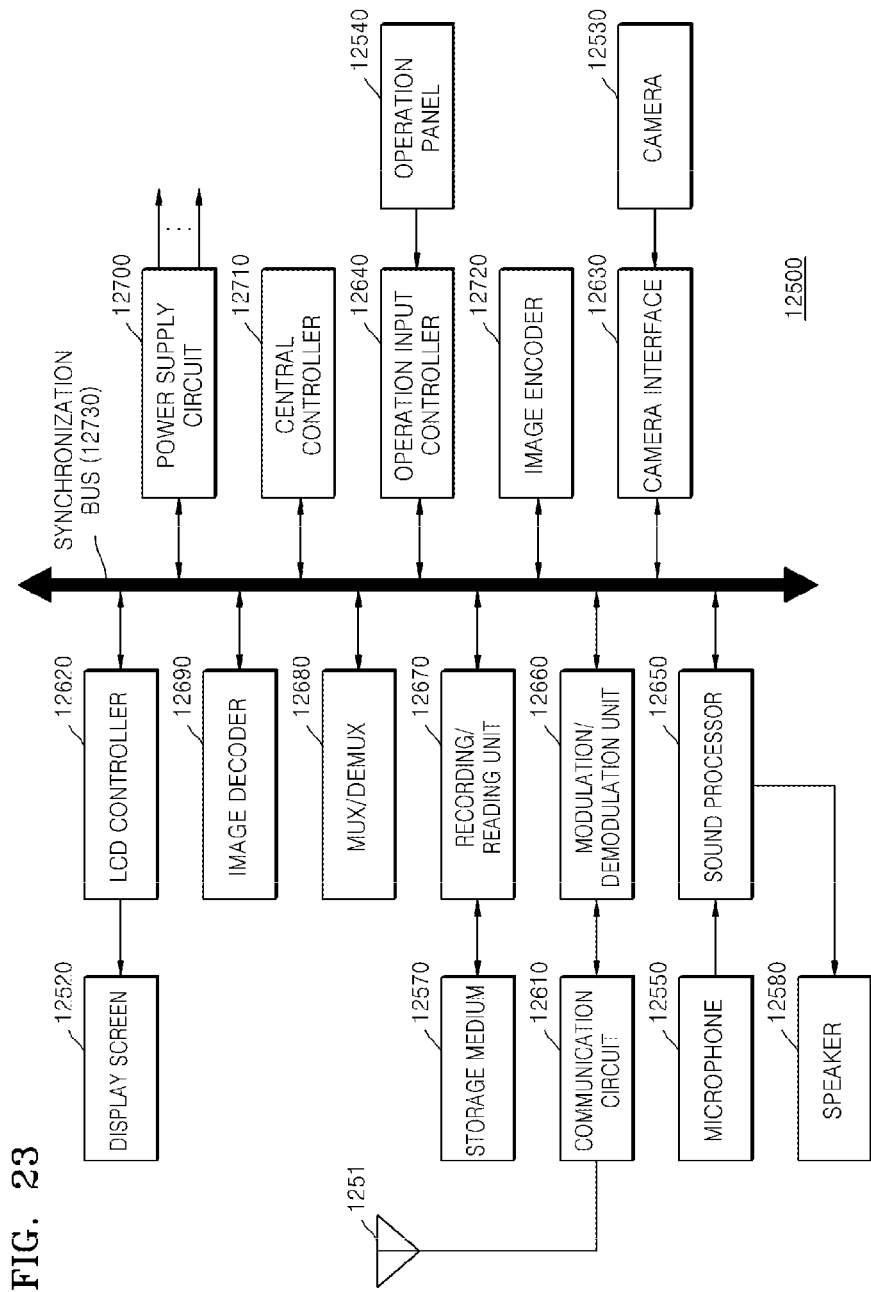

FIG. 23 illustrates an internal structure of the mobile phone 12500, according to an embodiment of the present invention. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to a video encoding method employed by the video encoding apparatus 100 or the image encoder 400 described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment of the present invention, may be a transceiving terminal including only the video encoding apparatus, or may be a transceiving terminal including only the video decoding apparatus.

Figure 24:
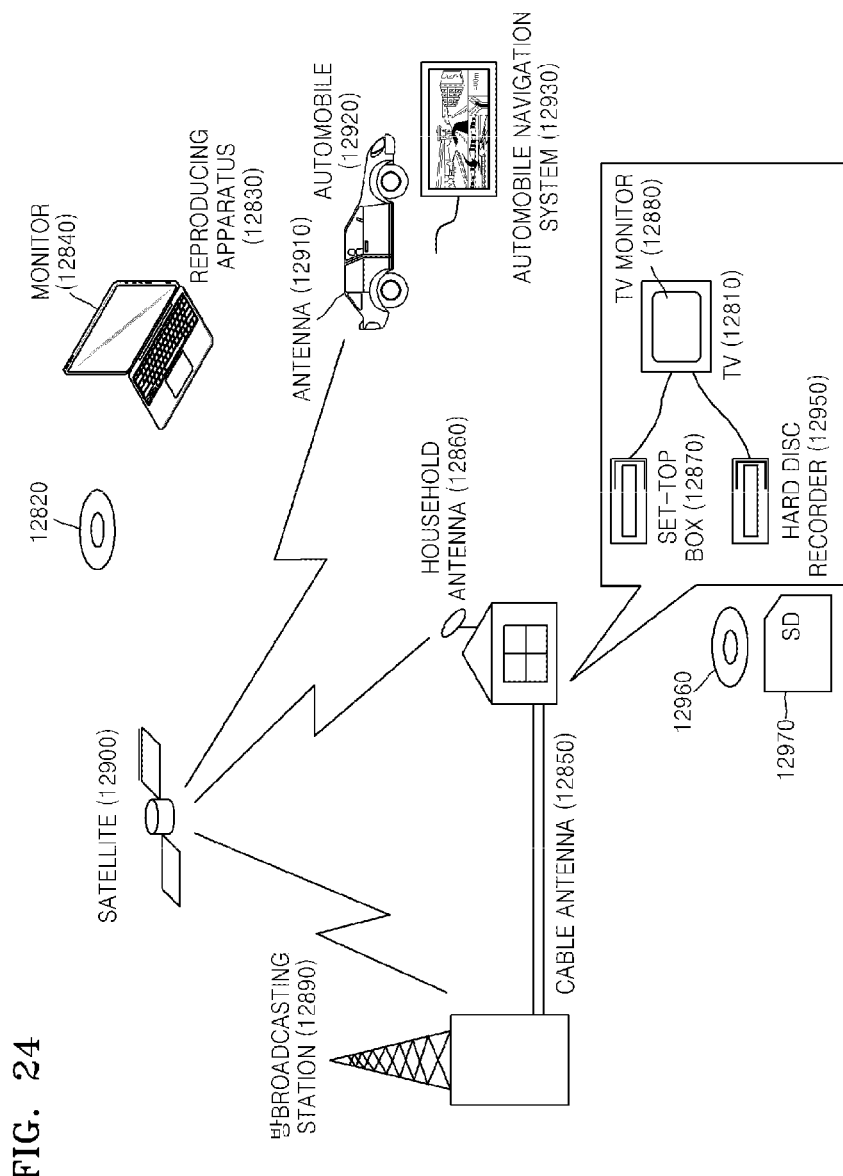
FIG. 24 is a diagram of a digital broadcast system to which a communication system is applied, according to an embodiment of the present invention.

A communication system according to the present invention is not limited to the communication system described above with reference to FIG. 21. For example, FIG. 24 illustrates a digital broadcasting system employing a communication system, according to an embodiment of the present invention. The digital broadcasting system of FIG. 24 may receive a digital broadcast transmitted via a satellite or a terrestrial network by using a video encoding apparatus and a video decoding apparatus according to an embodiment of the present invention.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an embodiment of the present invention is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an embodiment of the present invention may be installed. Data output from the set-top box 12870 may also be reproduced on a TV monitor 12880.

As another example, a video decoding apparatus according to an embodiment of the present invention may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to an embodiment of the present invention and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an embodiment of the present invention, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 23. For example, the computer 12100 and the TV receiver 12810 may not be included in the camera 12530, the camera interface 12630, and the image encoding unit 12720 of FIG. 23.

Figure 25:
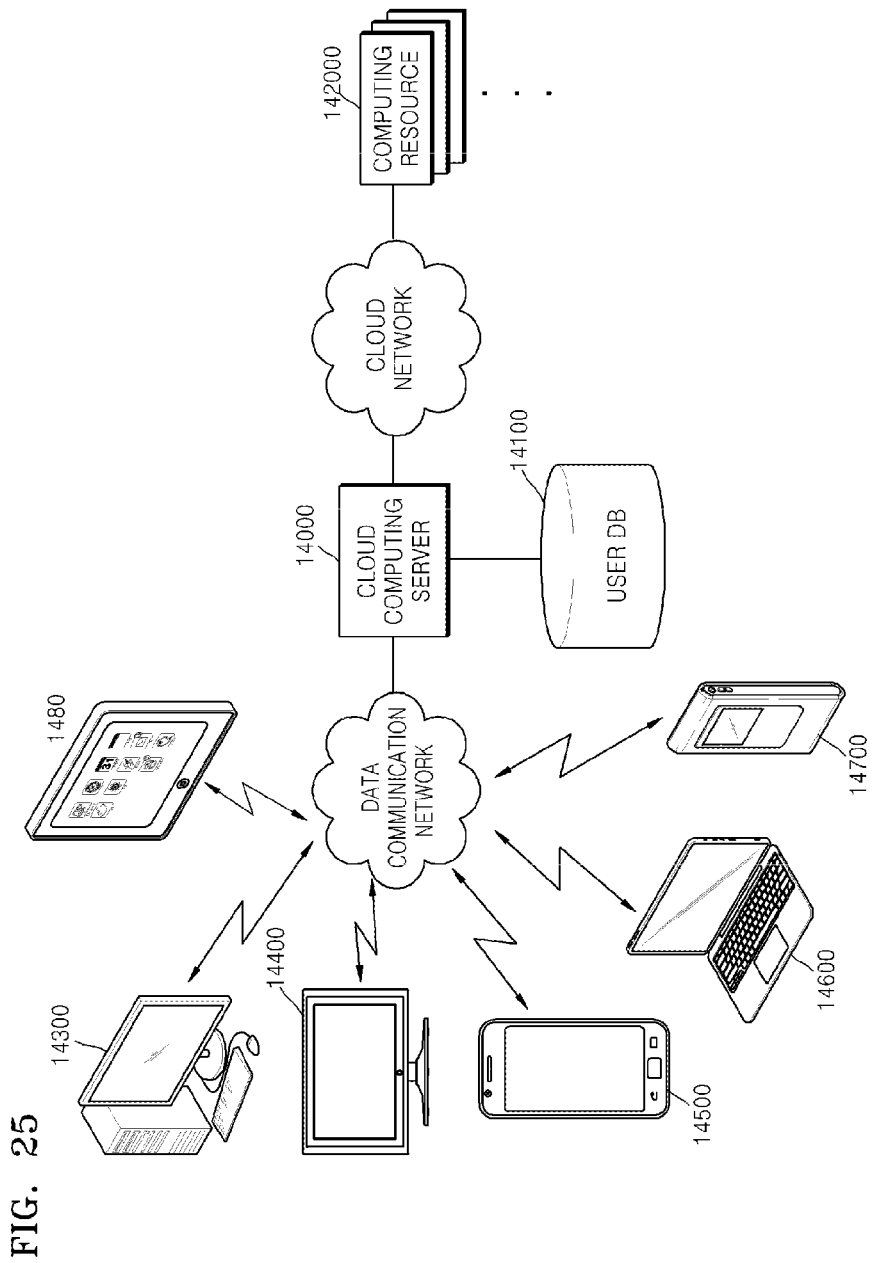
FIG. 25 is a diagram illustrating a network structure of a cloud computing system using a video encoding apparatus and a video decoding apparatus, according to an embodiment of the present invention.

FIG. 25 is a diagram illustrating a network structure of a cloud computing system using a video encoding apparatus and a video decoding apparatus, according to an embodiment of the present invention.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIGS. 22 and 23.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1 to 18. As another example, the user terminal may include a video encoding apparatus as described above with reference to FIGS. 1 to 18. Alternatively, the user terminal may include both the video decoding apparatus and the video encoding apparatus as described above with reference to FIGS. 1 to 18.

Various applications of a video encoding method, a video decoding method, a video encoding apparatus, and a video decoding apparatus according to embodiments of the present invention described above with reference to FIGS. 1 to 18 have been described above with reference to FIGS. 19 to 25. However, methods of storing the video encoding method and the video decoding method in a storage medium or methods of implementing the video encoding apparatus and the video decoding apparatus in a device, according to various embodiments of the present invention, are not limited to the embodiments described above with reference to FIGS. 19 to 25.

What is claimed is:

1. A video decoding apparatus comprising:
at least one processor configured to receive a bitstream, to obtain, from a slice header included in the bitstream, Least Significant Bits (LSB) information regarding picture order count (POC) information of a current long-term reference image of a current image, to determine Most Significant Bits (MSB) information regarding the POC information of the current long-term reference image of the current image based on MSB information regarding POC information of a previous long-term reference image of the current image and a difference between the MSB information regarding the POC information of the current long-term reference image of the current image and the MSB information regarding the POC information of the previous long-term reference image of the current image, to determine the POC information of the current long-term reference image of the current image by using the LSB information and the MSB information regarding the POC information of the current long-term reference image of the current image, and to reconstruct the current image by using the current long-term reference image of the current image corresponding to the POC information of the current long-term reference image of the current image,
wherein the MSB information regarding the POC information of the current long-term reference image of the current image is information regarding a quotient generated by dividing a value related to the POC information of the current long-term reference image of the current image by a maximum size of the LSB information, and the LSB information is information regarding a remainder value generated by dividing the POC information of the current long-term reference image of the current image by the maximum size of the LSB information.

2. A video encoding apparatus comprising:
at least one processor configured to perform an inter prediction on a current image by using a current long-term reference image of the current image, to obtain picture order count (POC) information of the current long-term reference image of the current image corresponding to the current long-term reference image of the current image, to generate least significant bits (LSB) information regarding the POC information of the current long-term reference image of the current image, and to generate a slice header including the LSB information regarding the POC information of the current long-term reference image of the current image,
wherein the LSB information is information regarding a remainder value generated by dividing the POC information of the current long-term reference image of the current image by a maximum size of the LSB information.

3. A non-transitory computer-readable storage medium storing a bitstream comprising:
a slice header including least significant bits (LSB) information regarding picture order count (POC) information of a current long-term reference image of a current image,
wherein the LSB information regarding the POC information of the current long-term reference image of the current image is generated based on the POC information of the current long-term reference image of the current image corresponding to the current long-term reference image of the current image,
wherein the POC information of the current long-term reference image of the current image is obtained by performing an inter prediction on the current image by using the current long-term reference image of the current image, and
wherein the current image includes a plurality of maximum coding units, and wherein the LSB information is information regarding a remainder value generated by dividing the POC information of the current long-term reference image of the current image by a maximum size of the LSB information.

* * * * *